US012267136B2

(12) United States Patent
Wu et al.

(10) Patent No.: US 12,267,136 B2
(45) Date of Patent: Apr. 1, 2025

(54) BEAM TRAINING FOR BI-DIRECTIONAL FULL-DUPLEX SIDELINK COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Sourjya Dutta, San Diego, CA (US); Anantharaman Balasubramanian, San Diego, CA (US); Hui Guo, Beijing (CN); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/039,465

(22) PCT Filed: Feb. 19, 2021

(86) PCT No.: PCT/CN2021/076844
§ 371 (c)(1),
(2) Date: May 30, 2023

(87) PCT Pub. No.: WO2022/174386
PCT Pub. Date: Aug. 25, 2022

(65) Prior Publication Data
US 2024/0007167 A1  Jan. 4, 2024

(51) Int. Cl.
*H04B 7/06* (2006.01)
*H04L 5/14* (2006.01)
(52) U.S. Cl.
CPC ......... *H04B 7/0632* (2013.01); *H04B 7/0695* (2013.01); *H04L 5/14* (2013.01)
(58) Field of Classification Search
CPC ........ H04B 7/0632; H04B 7/0695; H04L 5/14
See application file for complete search history.

(56) References Cited

U.S. PATENT DOCUMENTS

2018/0368004 A1\* 12/2018 Subramanian ......... H04B 7/063
2020/0052753 A1   2/2020 Raghavan et al.
(Continued)

FOREIGN PATENT DOCUMENTS

EP      4030677 A1 \*  7/2022  .......... H04B 7/0408
WO    2017066917 A1     4/2017
(Continued)

OTHER PUBLICATIONS

International Search Report and Written Opinion—PCT/CN2021/076844—ISA/EPO—Nov. 10, 2021.
(Continued)

*Primary Examiner* — Jean B Corrielus
(74) *Attorney, Agent, or Firm* — Procopio, Cory, Hargreaves & Savitch LLP

(57) ABSTRACT

The apparatus may be a first UE. The first UE may determine a first set of candidate BPLs associated with a first SL and a second set of candidate BPLs associated with a second SL. The first UE may further determine a configuration for FD beam training based on the determined first set of candidate BPLs and the determined second set of candidate BPLs, the FD beam training configuration may include multiple instances for which the first UE transmits and receives RS at a same time. The apparatus may also select, based on the determined FD beam training configuration, a first BPL in the first set of candidate BPLs for the first SL and a second BPL in the second set of candidate BPLs for the second SL. The first UE may establish FD communication with the second UE based on the selected first BPL and the selected second BPL.

25 Claims, 15 Drawing Sheets

(56) References Cited

U.S. PATENT DOCUMENTS

2020/0396718 A1    12/2020  Luo et al.
2020/0413295 A1*   12/2020  Li ......................... H04W 72/53

FOREIGN PATENT DOCUMENTS

WO    2017204932 A1    11/2017
WO    2018086973 A1     5/2018
WO    2020033076 A1     2/2020
WO    2020046062 A1     3/2020

OTHER PUBLICATIONS

Supplementary European Search Report—EP21926106—Search Authority—Munich—Oct. 23, 2024.

* cited by examiner

BEAM TRAINING FOR BI-DIRECTIONAL FULL-DUPLEX SIDELINK COMMUNICATION

CROSS REFERENCE TO RELATED APPLICATION(S)

This application is a National Stage Application filed under 35 U.S.C. § 371 of PCT International Application No. PCT/CN2021/076844, entitled "BEAM TRAINING FOR BI-DIRECTIONAL FULL-DUPLEX SIDELINK COMMUNICATION" and filed Feb. 19, 2021, which is expressly incorporated by reference herein in its entirety.

BACKGROUND

Technical Field

The present disclosure relates generally to communication systems, and more particularly, to beam training for sidelink (SL) full-duplex (FD) communication between user equipments (UEs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of wireless communication, e.g., 5G NR, UEs (e.g., vehicles) may have multiple transmission-reception points (TRPs). For example, a car may have front and rear antenna panels, while larger vehicles, like trucks and trailers, may have more than two TRPs. The TRPs may be configured as different RF modules with shared hardware/software controller. Because the TRPs of vehicles may be separated by a significant distance (e.g., four or more meters), each of the TRPs may receive and/or transmit for a particular channel differently due to (1) differences in distance from a transmitter and/or receiver, (2) differences in whether the different TRPs have a line of sight (LOS) (or do not have line of sight (non-LOS or NLOS)) with the transmitter and/or receiver, (3) blocking, etc. Accordingly, FD vehicle-to-vehicle (V2V) or vehicle-to-anything (V2X) communication may be feasible for a UE (e.g., a vehicle) equipped with multiple spatially separated TRPs.

Specifically, a UE may be able to receive using a first TRP while transmitting using a second TRP. Alternatively, or additionally, FD V2X communication may be feasible for a large antenna panel by using a first set of antenna elements of the panel to receive communications while using a second set of antenna elements of the panel to transmit communications. In either case, FD communication may be single frequency (SF) FD (SFFD) or sub-band (SB) FD (SBFD), where SFFD allows transmission and reception using a same frequency resource to receive and transmit at a same time and SBFD allows transmission and reception at a same time using different frequency resources. It may be beneficial to introduce novel beam training methods for SL FD V2X communication.

In an aspect of the disclosure, a method, a computer-readable medium, and an apparatus are provided. The apparatus may be a first device at a first UE. The first device may be a processor and/or modem at a UE or the UE itself. The first device may be configured to determine (1) a first set of candidate beam-pair links (BPLs) associated with a first SL, the first UE transmitting data to a second UE via the first SL and (2) a second set of candidate BPLs associated with a second SL, the first UE receiving data from the second UE via the second SL The first UE may further be configured to determine a configuration for FD beam training based on the determined first set of candidate BPLs and the determined second set of candidate BPLs, the configuration for FD beam training may include (e.g., specify) multiple instances for which the first UE transmits and receives RS at a same time. The first UE may also be configured to select, based on the determined configuration for FD beam training, (1) a first BPL in the first set of candidate BPLs for the first SL and (2) a second BPL in the second set of candidate BPLs for the second SL. The first UE may further be configured to establish FD communication with the second UE based on the selected first BPL and the selected second BPL.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
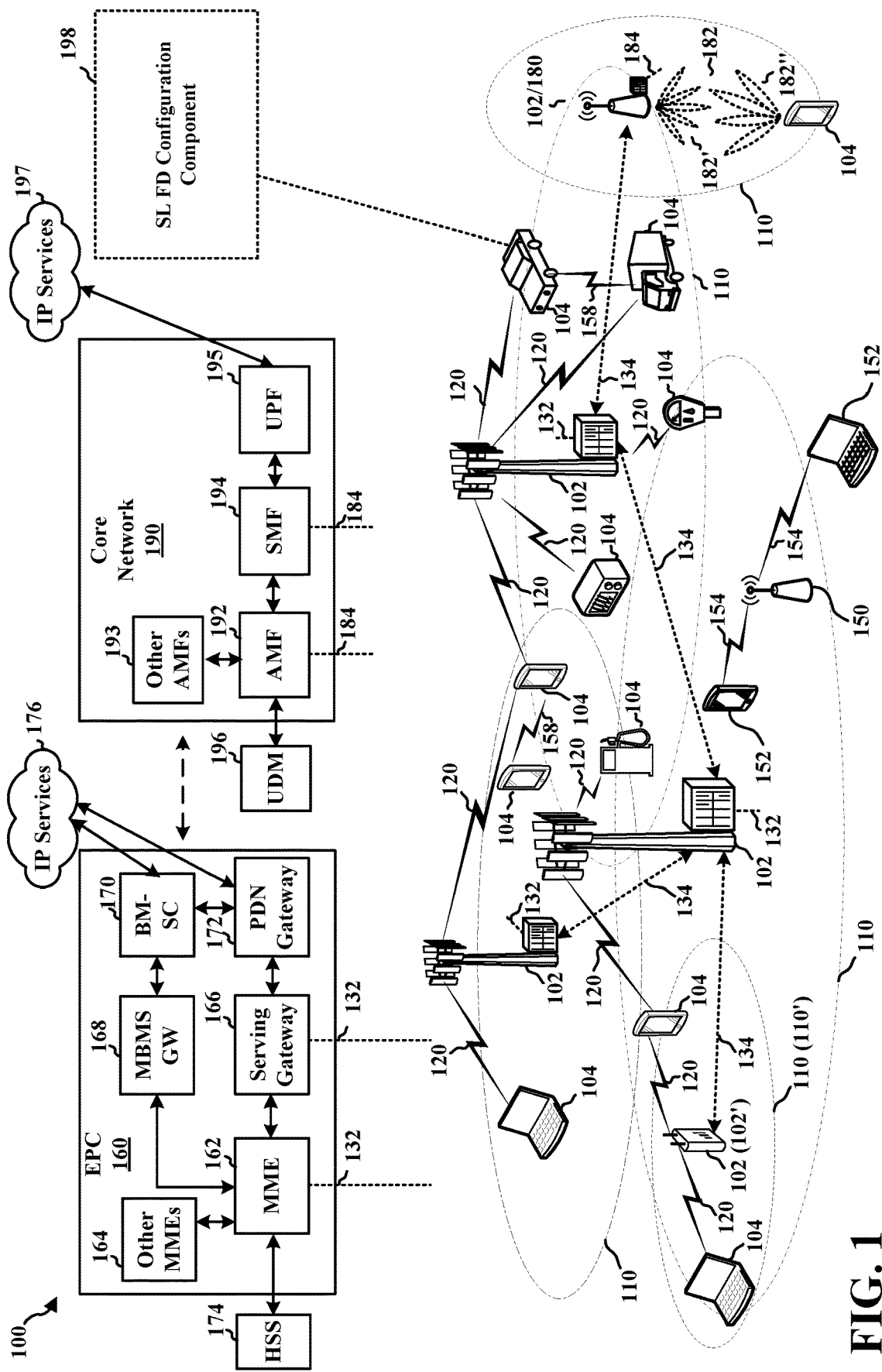
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a SL FD configuration component 198 that may be configured to determine (1) a first set of candidate BPLs associated with a first SL, the first UE transmitting data to a second UE via the first SL and (2) a second set of candidate BPLs associated with a second SL, the first UE receiving data from the second UE via the second SL; determine a configuration for FD beam training based on the determined first set of candidate BPLs and the determined second set of candidate BPLs, the configuration for FD beam training including multiple instances for which the first UE transmits and receives RS at a same time; select, based on the determined configuration for FD beam training, (1) a first BPL in the first set of candidate BPLs for the first SL and (2) a second BPL in the second set of candidate BPLs for the second SL; and establish FD communication with the second UE based on the selected first BPL and the selected second BPL. Although the following description may be focused on 5G NR, the concepts described herein may be applicable to other similar areas, such as LTE, LTE-A, CDMA, GSM, and other wireless technologies.

Figure 2:
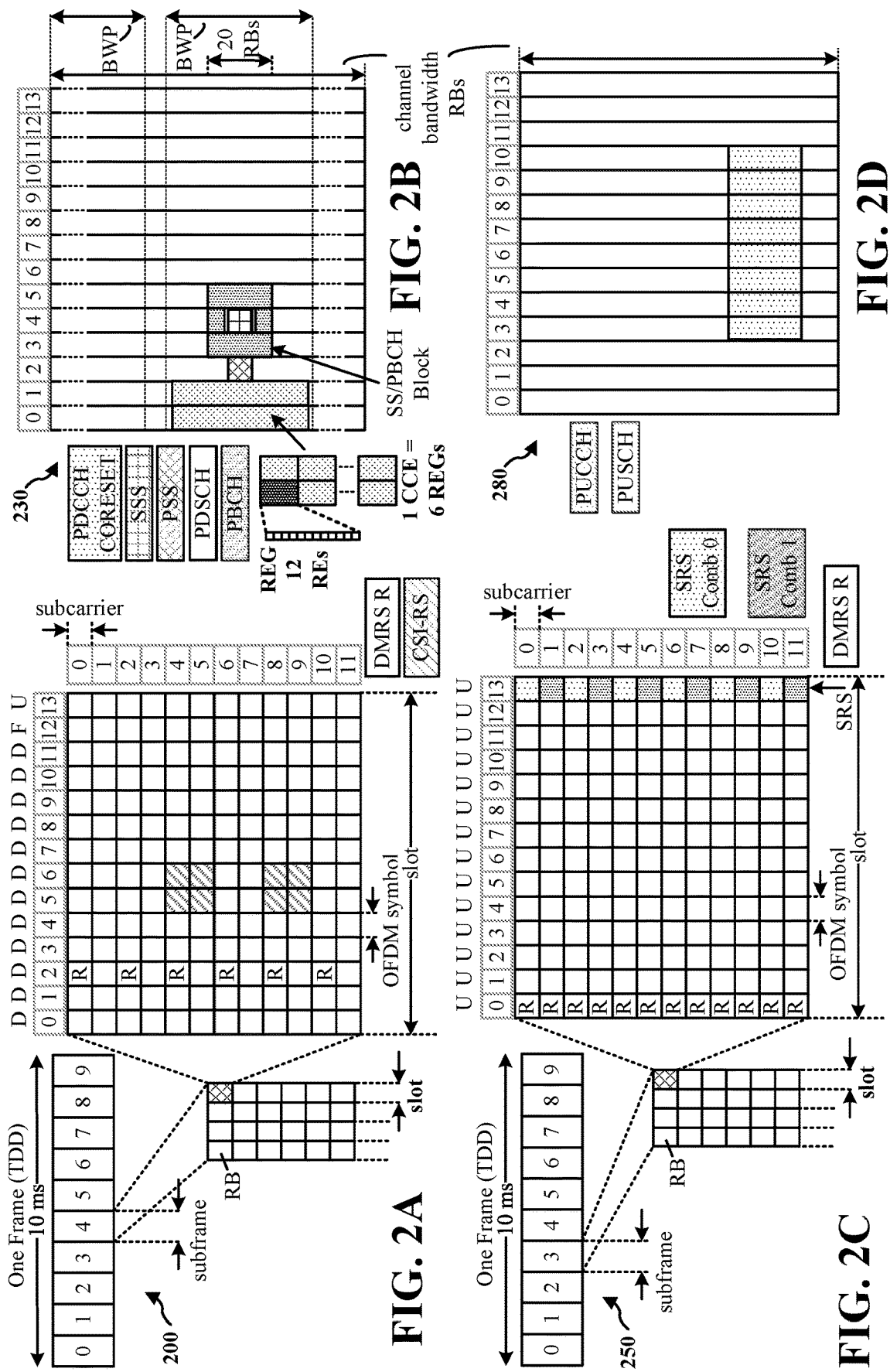
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
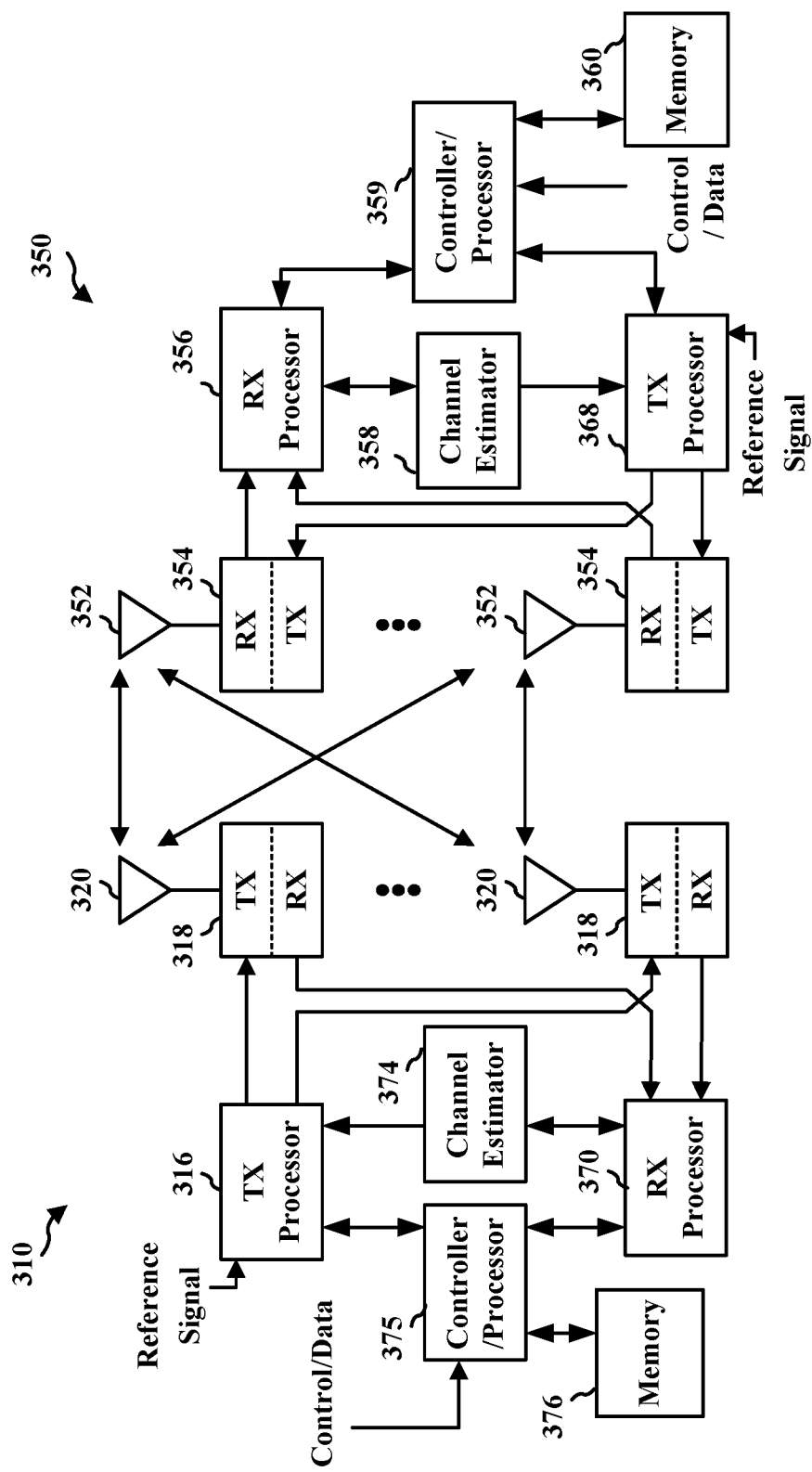
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIGs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In some aspects of wireless communication, e.g., 5G NR, UEs (e.g., vehicles) may have multiple TRPs. For example, a car may have front and rear antenna panels, while larger vehicles, like trucks and trailers, may have more than two TRPs. The TRPs may be configured as different RF modules with shared hardware/software controller. Because the TRPs of vehicles may be separated by a significant distance (e.g., four or more meters), each of the TRPs may receive and/or transmit for a particular channel differently due to (1) differences in distance from a transmitter and/or receiver, (2) differences in whether the different TRPs have a LOS (or do not have line of sight (NLOS)) with the transmitter and/or receiver, (3) blocking, etc. Accordingly, FD V2V or V2X communication may be feasible for a UE (e.g., a vehicle) equipped with multiple spatially separated TRPs.

Specifically, a UE may be able to receive using a first TRP while transmitting using a second TRP. Alternatively, or additionally, FD V2X communication may be feasible for a large antenna panel by using a first set of antenna elements of the panel to receive communications while using a second set of antenna elements of the panel to transmit communications. In either case, FD communication may be SFFD or SBFD, where SFFD allows transmission and reception using a same frequency resource to receive and transmit at a same time and SBFD allows transmission and reception at a same time using different frequency resources.

In some aspects of wireless communication, e.g., 5G NR, a beam training mechanism for use in connection with transmission/reception beamforming (e.g., for FR2) may specify, for a transmitter and/or receiver, a first beam sweeping mechanism and a second beam refinement mechanism. The transmitter and/or receiver may perform beam sweeping to determine a best BPL. Beam refinement may be performed by the transmitter and/or receiver to further improve the connection by selecting a narrower beam.

Beam sweeping, in some aspects, may be used to identify a most suitable or best combination of transmission beam and reception beam (e.g., based on signal strength or quality). In some aspects, the beam sweeping may be performed before an RRC connection is established between the transmitting and receiving UEs and may use a beam sweeping configuration that is common to (e.g., known by) both the transmitting and receiving UEs. For example, a transmitting UE (e.g., a first TRP of the transmitting UE) may transmit in N different directions while a receiving UE (e.g., a second TRP of the receiving UE) may receive using M different receiving beam directions. The receiver may then measure the N*M BPLs, and select the most suitable or best BPL (e.g., the BPL with the highest reference signal received power (RSRP), reference signal received quality (RSRQ), or signal-to-interference-plus-noise ratio (SINR)). The beam sweeping may be based on a measurement of SL SSB or a SL RS resource (CSI-RS or SRS) transmitted by the transmitting UE.

Beam refinement, in some aspects, may be performed to further improve a connection based on the initial beam sweeping. For example, a SSB transmission may be based on a wide beam, while beam refinement may be performed using narrow beams (e.g., CSI-RS or SRS).

Figure 4:
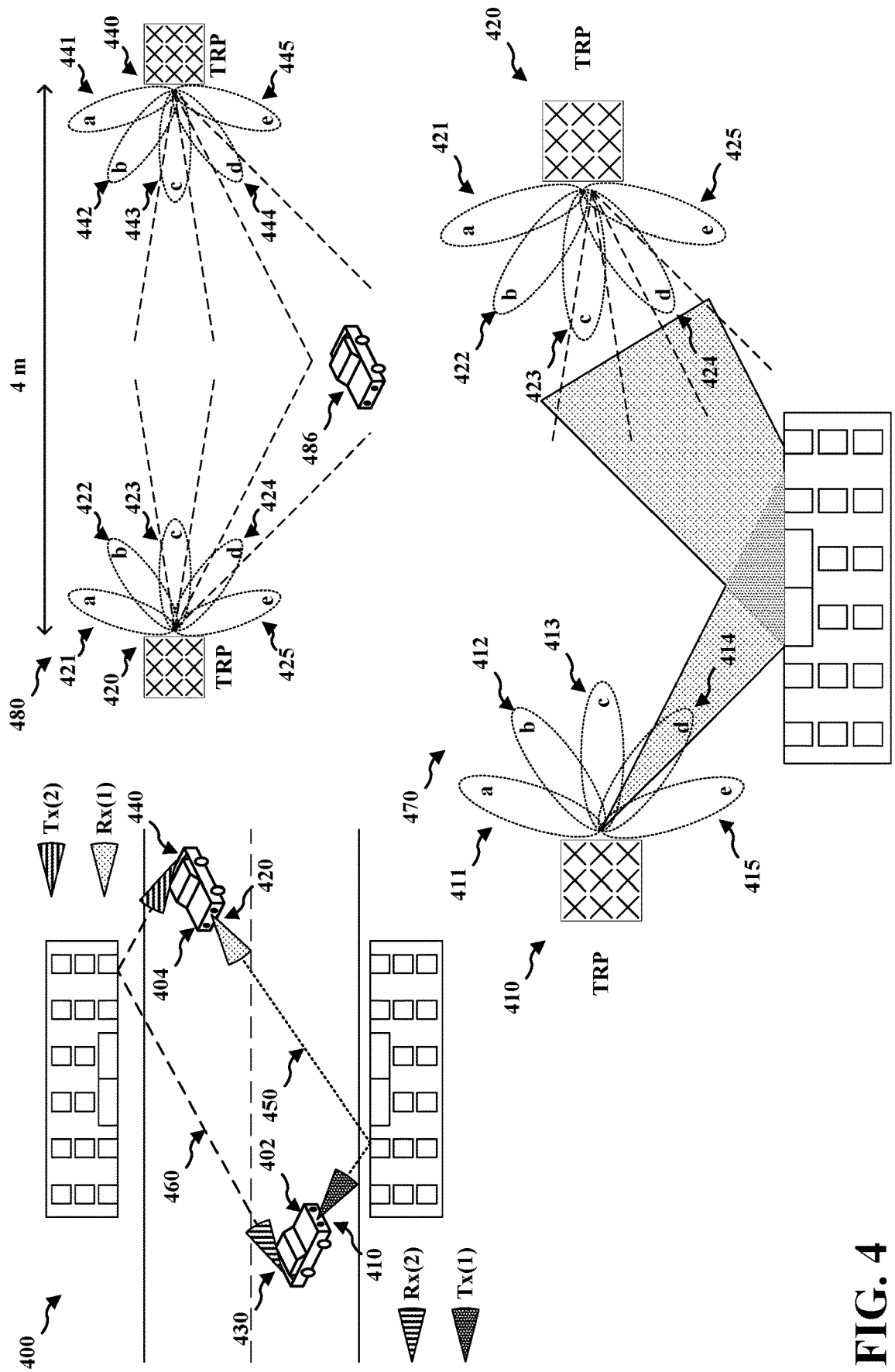
FIG. 4 is a set of diagrams illustrating aspects of FD SL communication between two UEs.

FIG. 4 is a set of diagrams 400, 470, and 480 illustrating aspects of FD SL communication between two UEs 402 and 404. Diagram 400 of FIG. 4 illustrates UEs 402 and 404 in FD SL communication each using a first TRP of the UE for reception (e.g., TRP 430 of UE 402 and TRP 420 of UE 404) and a second TRP of the UE for transmission (e.g., TRP 410 of UE 402 and TRP 440 of UE 404). The reception and transmission beam pairs for communications 450 and 460 may be identified based on a beam training process, as discussed in relation to FIGS. 6-14.

Diagram 470 of FIG. 4 indicates a set of transmit beams 411-415 from a TRP 410 (associated with UE 402) and a set of receive beams 421-425 at a TRP 420 (associated with UE 404). For transmit beam 414 in direction "d", diagram 470 illustrates a possible propagation of transmissions from TRP 410 to TRP 420. As illustrated, receive beam 424 in direction "d" and receive beam 423 in direction "c" may each receive transmissions from transmit beam 414 in direction "d". Each receive beam of TRP 420 may receive transmissions from transmit beam 414 in direction "d", however, different receive beams of TRP 420 may receive the transmissions with different strengths based on the relative orientations of the receive and transmission beams. The selection of the BPL associated with communication 460 may be based on the different signal strengths measured during beam training operations discussed below.

Diagram 480 illustrates a pair of TRPs 420 and 440 separated by a vehicle length (e.g., 4 m). As illustrated, while beam direction "c" 443 and beam direction "c" 423 are likely to contribute to high direct self-interference, the other beam directions 441, 442, 444, and 445 of the transmission TRP 440 are unlikely to contribute to direct self-interference at any of the receive beams 421-425 of TRP 420. However, additional SI from signals transmitted via transmission beams 441-445 of TRP 440 may be experienced due to reflections off objects (sometimes referred to as cluster interference). For example, in the presence of an object from which transmissions may be reflected (e.g., vehicle 486, buildings, etc.) transmission beam 444 of TRP 440 may be reflected such that the receive beam 424 of TRP 420 receives the signal with sufficient strength to be experienced as SI.

Figure 5:
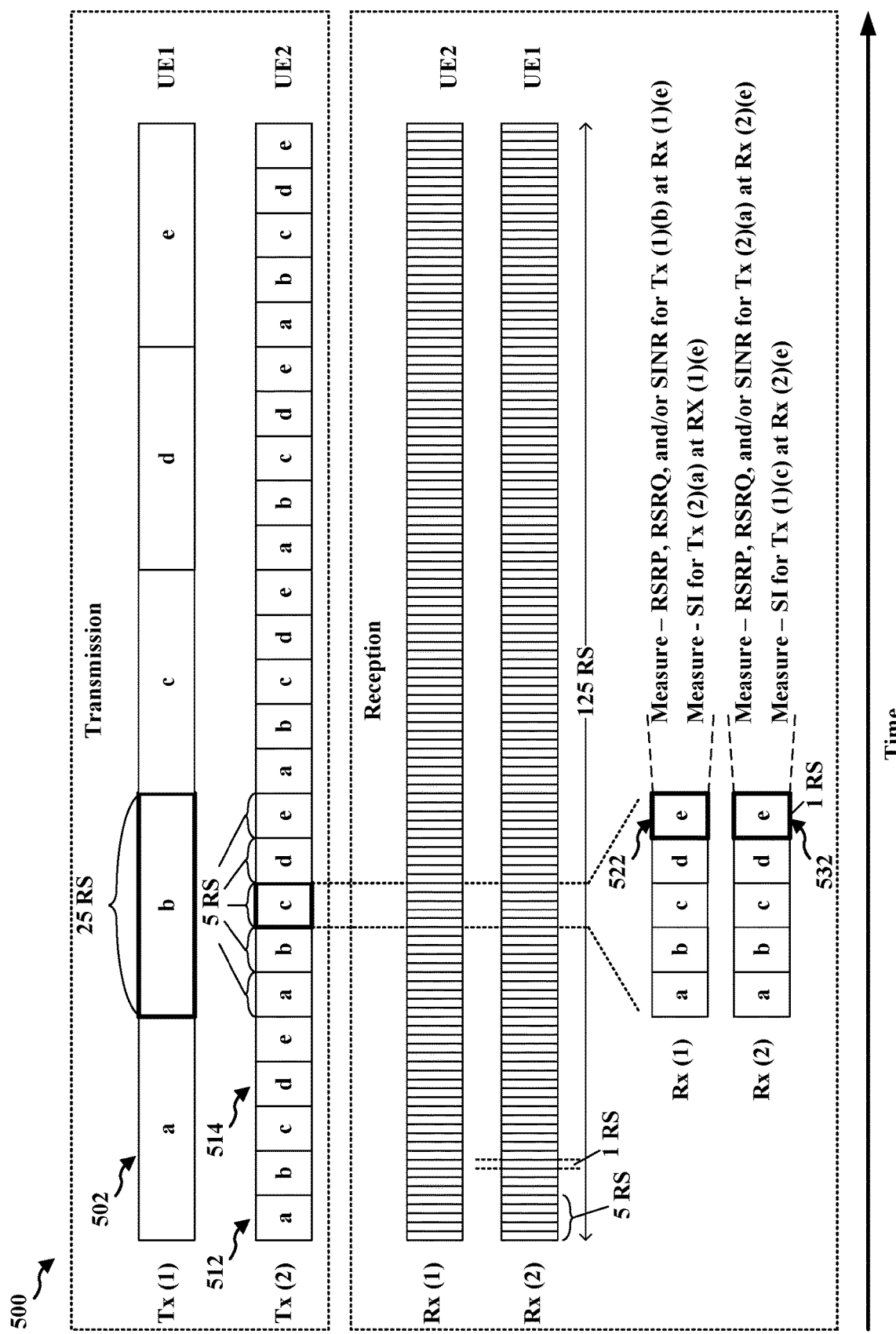
FIG. 5 includes a diagram illustrating a FD beam sweeping process.
Figure 6:
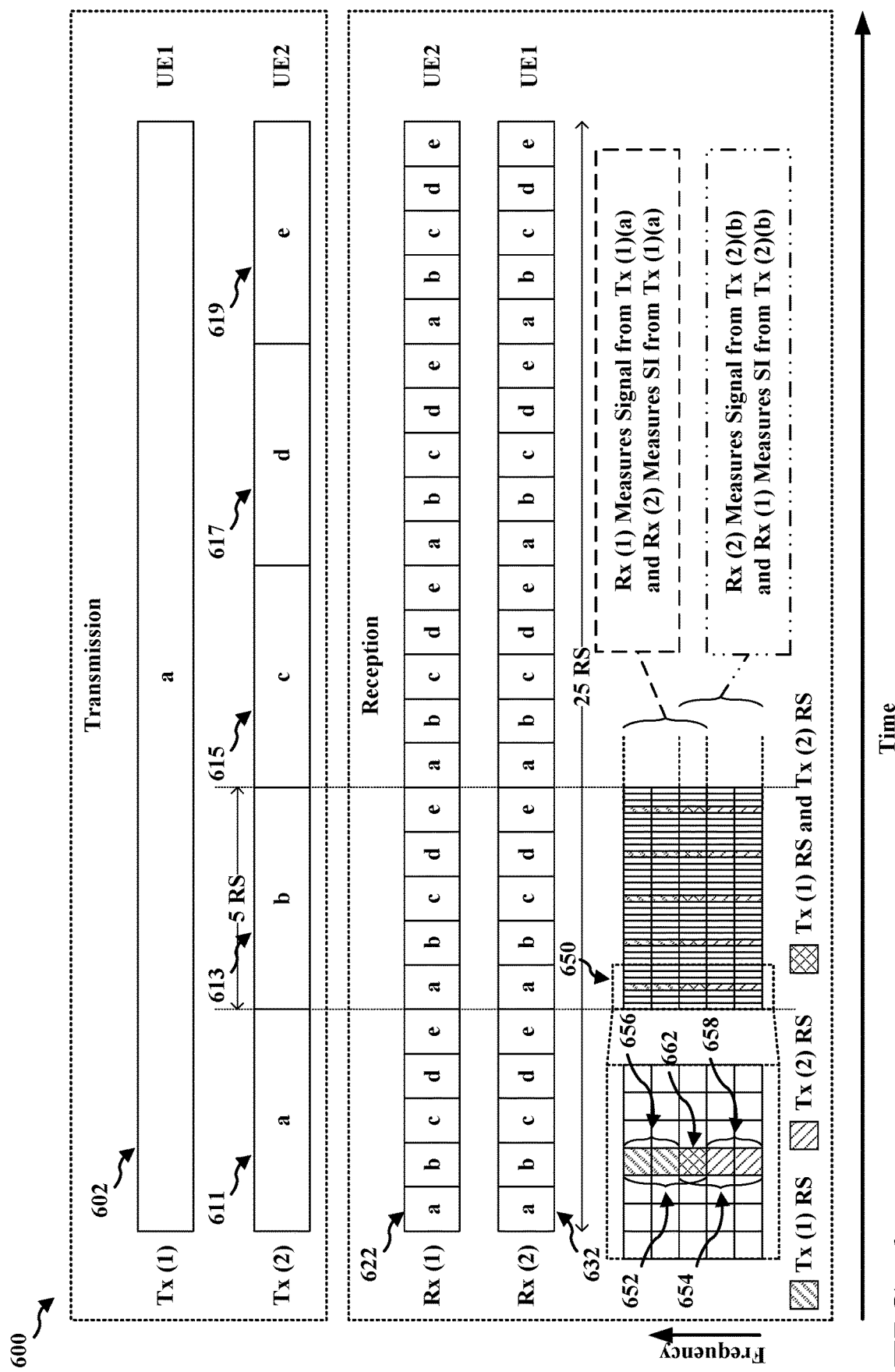
FIG. 6 includes a diagram illustrating a portion of the beam sweeping process of FIG. 5 in more detail.

FIG. 5 includes a diagram 500 illustrating a FD beam sweeping process. FIG. 6 includes a diagram 600 illustrating a portion of the beam sweeping process of FIG. 5 in more detail. The process illustrated in FIG. 5 illustrates the transmission and reception events at a first UE and a second UE (e.g., UE1 and UE2) associated with first and second unidirectional (i.e., from one UE to the other UE) SL communications that use different TRPs at the first and second UEs to establish bi-directional (e.g., FD) communication. For example, referring to FIG. 4, UE 404 may use TRP 440 to transmit data to TRP 430 of UE 402 for unidirectional SL connection 460, while UE 402 may use TRP 410 to transmit RS to TRP 420 of UE 404 for unidirectional SL connection 450. Unidirectional SL communications 450 and 460 together may be used as a bi-directional (e.g., FD) SL communication.

In order to determine a best BPL for each unidirectional SL communication, the beam sweeping process of FIG. 5 measures RS from every possible combination of transmit beams (e.g., Tx (1)(a) 502 and Tx (2)(a) 512 or Tx (1)(a) 502 and Tx (2)(d) 514, etc.) at every single receive beam (e.g., Rx (1)(e) 522 and Rx (2)(e) 532). In some aspects, each measurement instance (e.g., 522/622 or 532/632) measures a set of RS transmitted in a same slot and/or symbol in time that are transmitted using multiple frequencies by each TRP (e.g., TRPs 410 and 440). For example, referring to FIGS. 4 and 6, TRPs 410 and 440 may each transmit RS in a particular slot and/or symbol using at least two frequencies (e.g., sets of frequencies 652 and 654, respectively). For example, a set of RS may be transmitted for each combination of transmission beam directions from a first and second UE (e.g., Tx (1)(a) 602 and any of Tx (2)(a)-(e) 611-619) using the at least two frequencies. The at least two frequencies, in some aspects, include (1) at least one frequency that is not used by both TRP 410 and TRP 440 (e.g., non-overlapping sets of frequencies 656 and 658) and (2) at least one frequency that is used by both TRP 410 and TRP 440 (e.g., overlapping frequency 662). The overlapping resource 662 may be code division multiplexed (e.g., as an example method of distinguishing between the RS transmitted by TRP 410 and the RS transmitted by TRP 420), while the non-overlapping resources may not require code division multiplexing as they can be distinguished by the different frequencies used. FIG. 5 assumes that there are five beams (e.g., beam directions) used in the beam sweeping for both transmission and reception, however some aspects may have more, or fewer, beams (e.g., beam directions) for the transmission and/or reception.

As shown, the beam sweeping includes 125 RS measurement occasions with 25 RS measurement occasions associated with each beam direction of each of the TRPs of a first and second UE (e.g., UE1 and UE2). The RS measurement occasions are illustrated as being arranged such that a first TRP (e.g., of UE1) transmits using a first directional beam during 25 RS measurement occasions while a second TRP (e.g., of UE2) transmits using each of its five directional beams during five consecutive RS measurement occasions such that there are five RS measurement occasions for each pairing of transmission beam directions of the first and second TRPs. Each RS measurement occasion in a set of five RS measurement occasions having a same transmission beam pairing is measured by a third and fourth reception TRP using one of its five reception beam directions such that each reception beam is used to measure each combination of transmit beams from the first and second TRPs. Accordingly, there are 125 (e.g., 5*5*5 or N*N*M) RS measurement occasions to perform a complete beam sweeping and measure SI for each pair of transmit beams at each reception beam. As the number of possible beams (e.g., N beam directions) for transmission increases, the total number of measurements utilized may increase as the square of the number of the transmit beams (e.g., N*N). Additionally, the number of measurements may increase linearly with the number of possible beams (e.g., M beam directions) for reception (e.g., N*N*M).

FIG. 6 illustrates a set of 25 RS transmissions 602 by a first TRP of a first UE (e.g., TRP 410 of UE 402 in FIG. 4) in a first direction "a" (e.g., using a first beam). FIG. 6 further illustrates that a second TRP of a second UE (e.g., TRP 440 of UE 404 in FIG. 4) transmits five RS through each of five transmission beams 611-619 in directions "a" through "e" (e.g., using each possible transmission beam direction). FIG. 6 also illustrates that for each combination of a set of RS from the first TRP and a set of RS from the second TRP, each reception TRP (e.g., TRPs 420 and 430 of UEs 404 and 402, respectively in FIG. 4) performs measurements through reception beams in directions "a" through "e" (e.g., using each possible reception beam direction).

One RS measurement occasion 650 is expanded for clarity. As illustrated, RS reception occasion includes seven possible time periods (e.g., slots or symbols, etc.). In one of the time periods, each transmitting TRP (e.g., TRPs 410 and 440) sends a set of RS (e.g., RS set 652 and RS set 654) via a set of time-and-frequency resources. The set of RS may span multiple frequencies, as for RS sets 652 and 654 of FIG. 6, and may include overlapping frequencies, such as for RS 662, and non-overlapping frequencies, such as for RS sets 656 and 658. RS sets may also include RS sets that are non-overlapping in time such that a set of RS at particular frequencies transmitted from the first TRP (e.g., TRP 410) are transmitted during a first and second time slot, while a set of RS at partially overlapping frequencies are transmitted by the second TRP (e.g., TRP 440) in the second, overlapping, time slot as well as a third non-overlapping time slot (not shown).

As illustrated in FIG. 6, during a particular RS reception occasion, the reception TRPs (e.g., Rx (1) and Rx (2); TRPs 420 and 430 of FIG. 4) measure the RS from both transmission TRPs (e.g., RS sets 652 and 654 from Tx (1) and Tx (2)). As shown, Rx (1) measures the set of RS (e.g., RS set 652) from the corresponding transmission TRP, Tx (1). Additionally, in some aspects, Rx (1) measures SI from the set of RS (e.g., RS 654) from the transmission TRP of the same UE, Tx (2). Similarly, Rx (2) measures the set of RS (e.g., RS set 654) from the corresponding transmission TRP, Tx (2), and measures SI from the set of RS (e.g., RS 652) from the transmission TRP of the same UE, Tx (1). There may be a benefit to reducing the number of RS occasions spanned by a beam sweeping process.

Figure 7:
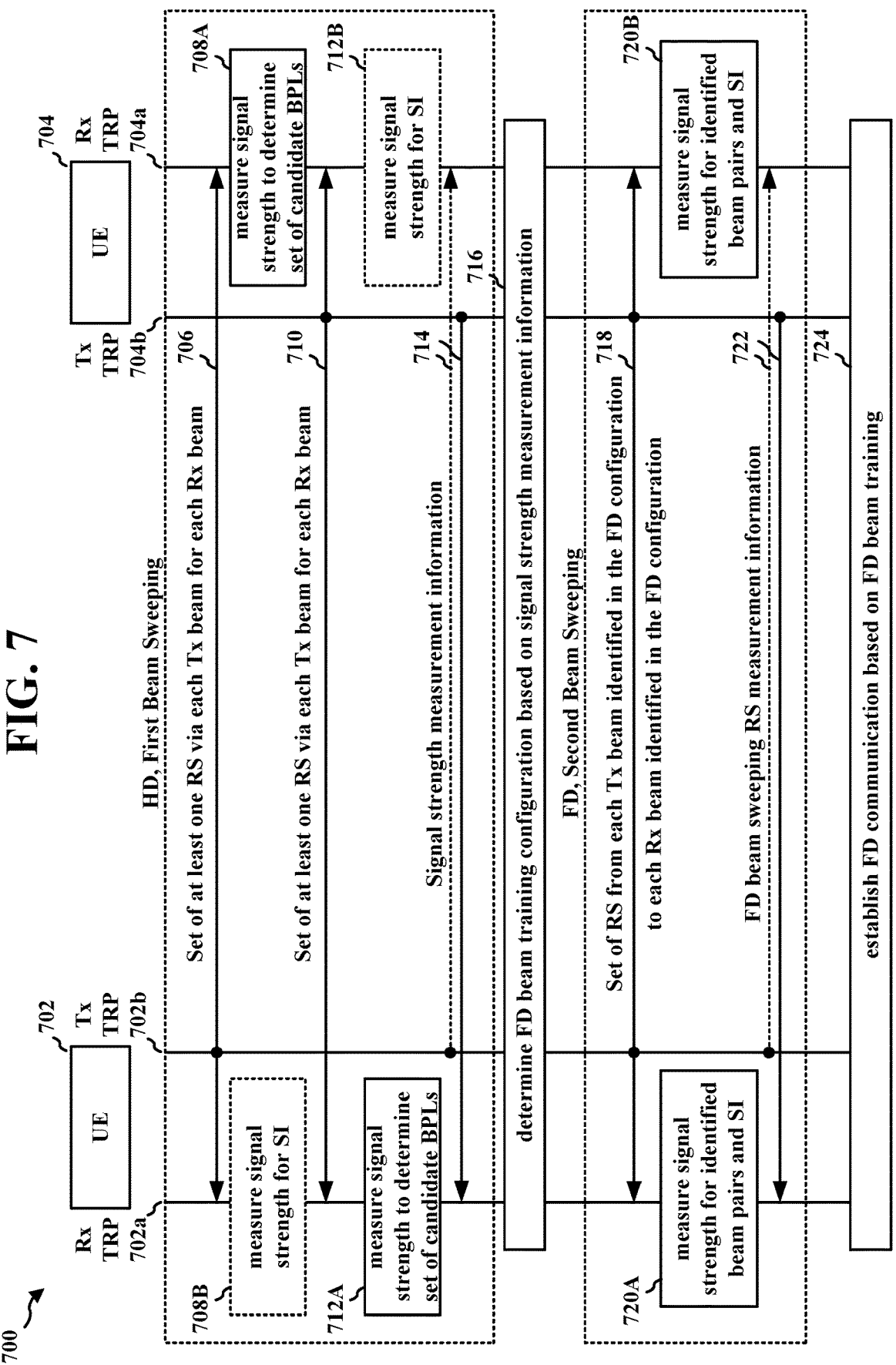
FIG. 7 is a call flow diagram illustrating a two-step beam sweeping process for identifying a first and second combination of transmission and reception beams that allow for FD communication.
Figure 8:
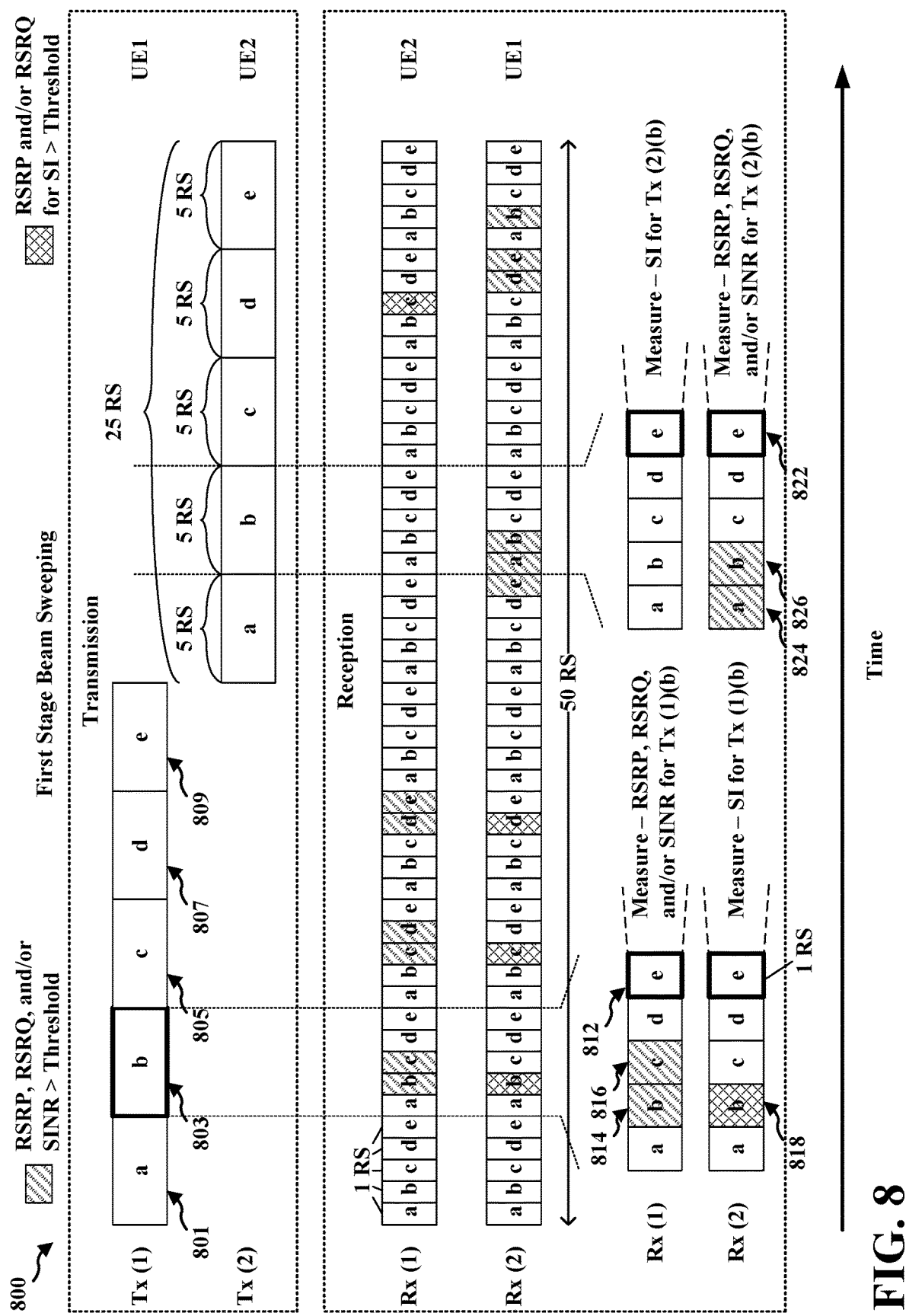
FIG. 8 is a diagram illustrating a half-duplex (HD), first beam sweeping step in a two-step beam sweeping process.
Figure 9:
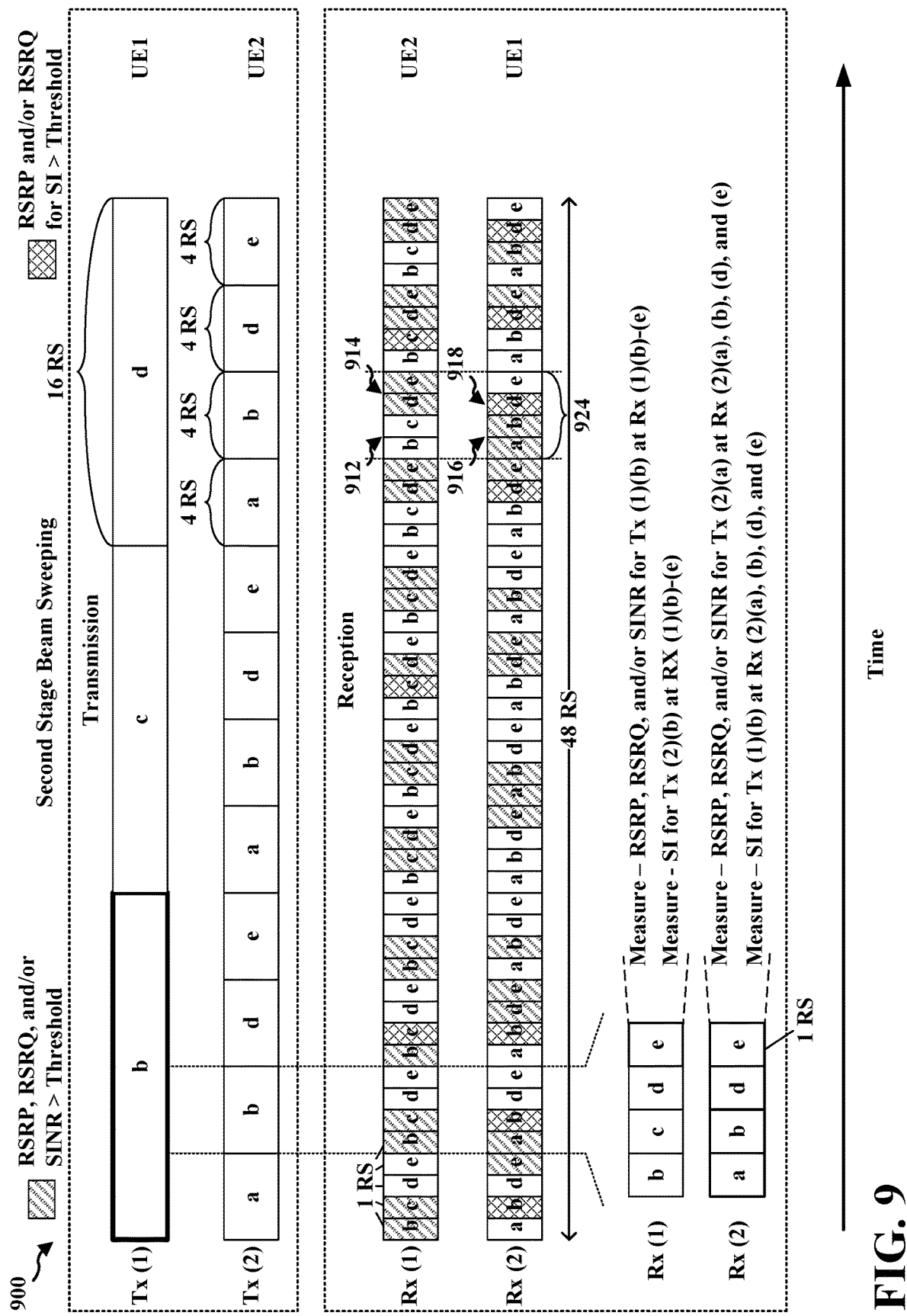
FIG. 9 is a diagram illustrating an example FD, second beam sweeping step in a two-step beam sweeping process.
Figure 10:
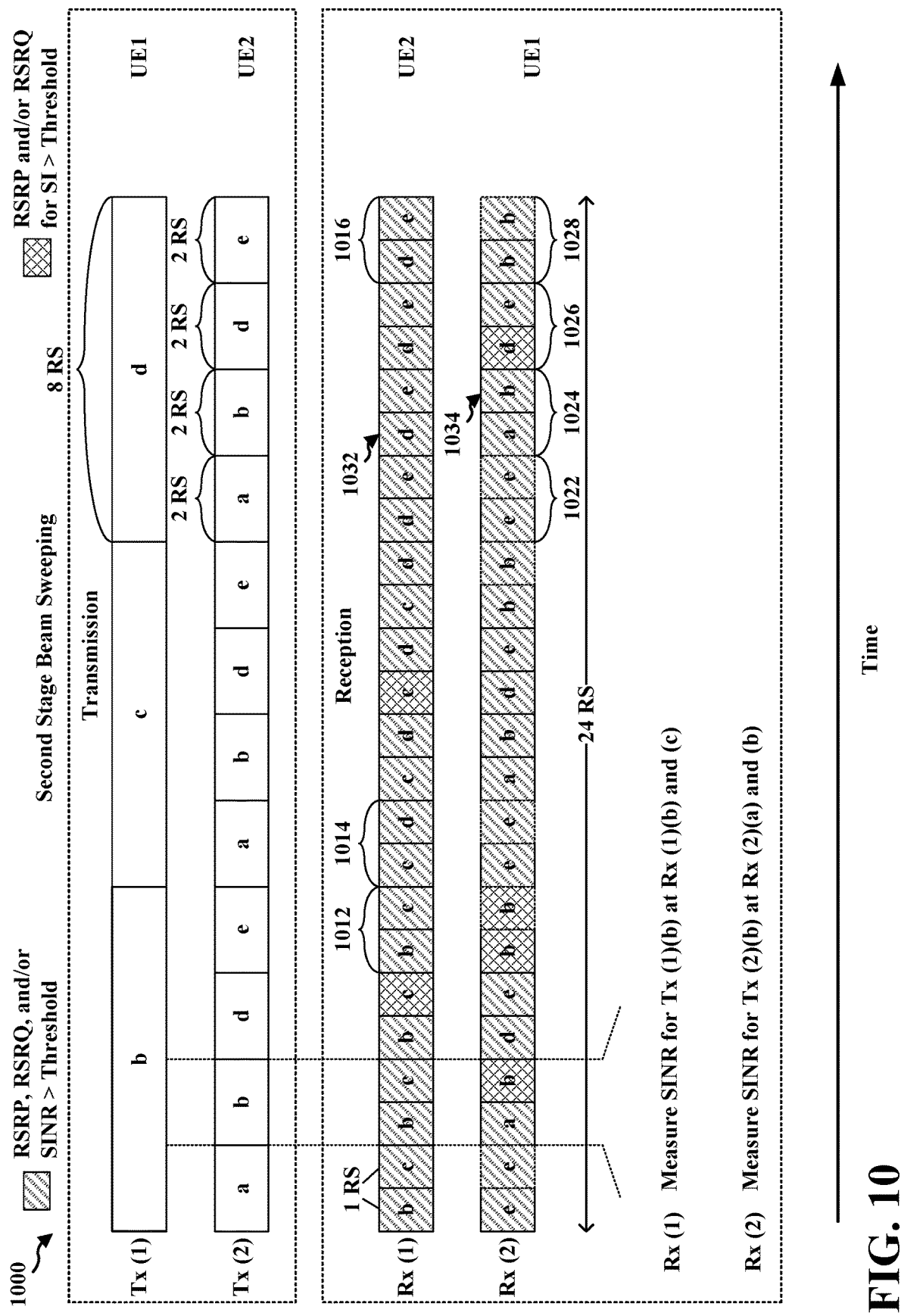
FIG. 10 is a diagram illustrating a second example FD, second beam sweeping step in a two-step beam sweeping process.

FIG. 7 is a call flow diagram 700 illustrating a two-step beam sweeping process for identifying a first and second combination of transmission and reception beams (e.g., BPLs) that allow for FD communication. FIGS. 8-10 illustrate examples of first and second steps of a two-step beam sweeping process. FIG. 8 is a diagram 800 illustrating a HD, first beam sweeping step in a two-step beam sweeping process. FIG. 9 is a diagram 900 illustrating an example FD, second beam sweeping step in a two-step beam sweeping process. FIG. 10 is a diagram 1000 illustrating a second example FD, second beam sweeping step in a two-step beam sweeping process.

FIG. 7 illustrates a first UE 702 and a second UE 704 that each have a receiving (Rx) TRP (e.g., Rx TRP 702a/704a) and transmitting (Tx) TRP (e.g., Tx TRP 702b/704b) used to establish FD communication. Optional operations are indicated with dotted lines. FIGS. 7 and 8 illustrate a HD, first beam sweeping step, that may be performed to determine (1) a first set of candidate BPLs associated with a first SL (e.g., a SL communication or connection) and (2) a second set of candidate BPLs associated with a second SL. The first SL may include transmitting data from the first UE 702 (e.g., via Tx TRP 702b) to the second UE 704 (e.g., via Rx TRP 704a) and the second SL may include receiving data at the first UE 702 (e.g., via Rx TRP 702a) from the second UE 704 (e.g., via Tx TRP 704b). As shown, UE 702 may transmit a set of at least one RS via each transmission beam 706 for reception by each reception beam. UE 704 may receive the at least one RS transmitted via each transmission beam 706 at each reception beam. For example, referring to FIG. 8, UE1 (e.g., which may correspond to UE 702) may transmit a set of five RS via each of a set of five transmit beams 801-809 (e.g., beam directions "a" through "e") for a total of 25 RS. UE2 (e.g., which may correspond to UE 704) may receive, via each reception beam, one or more RS transmitted via a particular transmission beam (e.g., any of beams "a" through "e"). In FIG. 8, the set of RS transmitted by UE1 (e.g., TRP 702b) includes 25 (N*M) RS occasions.

In order to determine the first set of candidate BPLs, the second UE 704, may measure 708A the signal strength of the RS received at each reception occasion. For example, referring to FIG. 8, the reception TRP Rx (1) of UE2 (e.g., which may correspond to Rx TRP 704a of UE 704) measures, via each reception beam direction (e.g., "a" through "e"), the signal strength of a RS transmitted via each beam direction (e.g., "a" through "e") of Tx (1) of UE1 (e.g., which may correspond to TRP 702b of UE 702). For example, at RS occasion 812, Rx (1) of UE2 measures, via beam direction "e", the signal strength (e.g., an RSRP, RSRQ, or SINR) of a signal transmitted by Tx (1) of UE1 via beam direction "b". The UE 702 may also receive, via each reception beam of Rx TRP 702a, the RS transmitted from the Tx TRP 702b via each transmission beam of Tx TRP 702b. The UE 702 may measure 708B the signal strength of the received transmissions to determine the level of SI. For example, referring to FIG. 8, at RS occasion 812 Rx (2) of UE1 (e.g., UE 702) measures self-interference (e.g., a RSRP, RSRQ, or SINR) based on the transmission from Tx (1) of UE1 (e.g., TRP 702b of UE 702) via beam direction "e".

As shown, UE 704 may transmit a set of at least one RS via each transmission beam for reception by each reception beam. UE 702 may receive the at least one RS transmitted via each transmission beam at each reception beam. For example, referring to FIG. 8, UE2 (e.g., which may correspond to UE 704) may transmit a set of five RS via each of a set of five transmit beams (e.g., beams "a" through "e") for a total of 25 RS. UE1 (e.g., which may correspond to UE 702) may receive, via each reception beam, one or more RS transmitted via a particular transmission beam (e.g., any of beams "a" through "e"). In FIG. 8, the set of RS transmitted by UE2 (e.g., TRP 704b) includes 25 (N*M) RS occasions.

In order to determine the second set of candidate BPLs, the first UE 702, may measure 712A the signal strength of the RS received at each reception occasion. For example, referring to FIG. 8, the reception TRP Rx (2) of UE1 (e.g., which may correspond to Rx TRP 702a of UE 702) measures, via each reception beam direction (e.g., "a" through "e"), the signal strength of a RS transmitted via each beam direction (e.g., "a" through "e") of Tx (2) of UE2 (e.g., which may correspond to TRP 704b of UE 704). For example, at RS occasion 822, Rx (2) of UE1 measures, via beam direction "e", the signal strength (e.g., an RSRP, RSRQ, or SINR) of a signal transmitted by Tx (2) of UE2 via beam direction "b". The UE 704 may also receive, via each reception beam of Rx TRP 704a, the RS transmitted from the Tx TRP 704b via each transmission beam of Tx TRP 704b. The UE 704 may measure 712B the signal strength of the received transmissions to determine the level of self-interference. For example, referring to FIG. 8, at RS occasion 822 Rx (1) of UE2 (e.g., UE 704) measures self-interference (e.g., a RSRP, RSRQ, or SINR) based on the transmission from Tx (2) of UE2 (e.g., TRP 704*b* of UE 704) via beam direction "e".

The first and second sets of candidate BPLs may be based on the measurements 708A/708B (and 712A/712B). The determined candidates may include each BPL (e.g., pair of reception beam and transmission beam) for which a measured RSRP, RSRQ, or SINR is above a threshold. The threshold may be pre-determined (or pre-configured). In some aspects, the threshold may be determined based on at least one of a RSRP, RSRQ, or SINR measured for at least one BPL in at least one set of candidate BPLs. The threshold, in some aspects, may be different for a first set of candidate BPLs determined (or identified) for a first SL and a second set of candidate BPLs determined (or identified) for a second SL. For example, a threshold may be based on a highest measured RSRP, RSRQ, or SINR (e.g., the threshold may be 10% of the highest measured RSRP, RSRQ, or SINR). In some aspects, a threshold number (e.g., 1, 5, 10, etc.) of BPLs with a highest RSRP, RSRQ, or SINR may be determined (identified) to be included in a set of candidate BPLs for each SL communication.

For example, referring to FIG. 8, candidate BPLs for a first SL communication (e.g., Tx (1) to Rx (1)) may be determined to be {Tx (1)(b), Rx (1)(b); Tx (1)(b), Rx (1)(c); Tx (1)(c), Rx (1)(c); Tx (1)(c), Rx (1)(d); Tx (1)(d), Rx (1)(d); Tx (1)(d), Rx (1)(e)} as indicated by the RS occasions (e.g., 814 and 816) identified as having an RSRP, RSRQ, or SINR that may be measured to be above a threshold. Candidate BPLs for a second SL communication (e.g., Tx (2) to Rx (2)) may be determined to be {Tx (2)(a), Rx (2)(e); Tx (2)(b), Rx (2)(a); Tx (2)(b), Rx (2)(b); Tx (2)(d), Rx (2)(d); Tx (2)(d), Rx (2)(e); Tx (2)(e), Rx (2)(b)} as indicated by the RS occasions (e.g., 824 and 826) identified as having an RSRP, RSRQ, or SINR that may be measured to be above a threshold.

In some aspects, the measurements of SI 708B and 712B may be used to exclude some combinations of BPLs in the first and second sets of candidate BPLs with a RSRP, RSRQ, or SINR above the threshold from a FD, second beam-sweeping step. For example, BPL combinations for which the BPLs each have at least one of a RSRP, RSRQ, or SINR that may be above a threshold (when measured without SI), but for which a RSRP, RSRQ, or SINR for the SI (e.g., in a specific beam direction/using a specific reception beam included in one of the BPLs) is above a different, SI threshold (e.g., RS reception occasion 818) may be excluded from further beam sweeping steps (e.g., a FD, second beam sweeping step). The different, SI threshold may be a pre-determined (or pre-configured) threshold or may be based on the measured 712A/708A signal strength of the RS for the BPLs including the reception beam experiencing the threshold level of SI. For example, referring to FIG. 8, Rx (2) may measure, in a reception direction "b", a RSRP, a RSRQ, or a SINR for SI from transmit beam Tx (1) in direction "b" that is above a threshold. Based on the identification of a threshold level of SI when using transmit beam Tx (1) in direction "b" and a receive beam Rx (2) in direction "b", some combinations of BPLs from the first set of candidate BPLs and the second set of candidate BPLs may not be included in a FD second beam sweeping step. For example, sets of BPLs including Tx (1)(b) and Rx (2)(b) may be excluded based on the SI detected between Tx (1)(b) and Rx (2)(b).

Based on the measurements 708A/712A (and 708B/712B) at least one of UE 702 or UE 704 transmits signal strength measurement information 714. The signal strength measurement information 714, may include at least one of, (1) the measured signal strengths (708A or 712A) and SI (708B or 712B) at the transmitting UE (e.g., UE 702 or UE 704), (2) a determined set of candidate BPLs for a particular SL communication, and/or (3) transmission configuration information (TCI) for each BPL in a set of candidate BPLs.

After transmitting and/or receiving signal strength information 714 at UE 702 and/or UE 704, at least one of UE 702 and/or UE 704 determines 716 a configuration for FD beam training based on the determined first and second sets of candidate BPLs. In some aspects, the FD configuration includes identifying multiple instances for which the first UE transmits and receives RS at a same time. The FD beam training (or sweeping) configuration may be based on the signal strengths measured (e.g., at 708A/708B/712A/712B) at a particular UE as well as the signal strength measurement information 714. The FD beam sweeping configuration may specify a set of transmit directions and receive directions that are included in any of the candidate BPLs in the first and second sets of candidate BPLs. For example, referring to FIGS. 8 and 9, the HD, first beam sweeping process may identify transmit beam directions Tx (1)(b), (c), and (d), and Tx (2)(a), (b), (d), and (e) and receive beam directions Rx (1)(b), (c), (d), and (e) and Rx (2)(a), (b), (d), and (e) as being included in at least one BPL in the sets of candidate BPLs.

Based on the determined 716 FD beam training configuration, UE 702 and UE 704 may transmit sets of RS from each transmit beam identified in the FD configuration as described below in relation to FIGS. 8-10. Each of UE 702 and UE 704 may (simultaneously) receive pairs of RS in the transmitted sets of RS and measure 720B signal strength and self-interference for the BPLs included in the FD beam sweeping configuration. For example, similarly to the beam sweeping process described above in relation to FIGS. 5 and 6, in order to determine a best BPL for each unidirectional SL communication, the FD, second beam-sweeping step of FIG. 9 measures RS from every possible combination of transmit beams identified as belonging to at least one BPL in a set of candidate BPLs at every receive beam identified as belonging to at least one BPL in a set of candidate BPLs. The measurements may include a RSRP, a RSRQ, or a SINR to determine a signal strength or quality in the presence of RS transmitted from a candidate transmission beam direction in the first set of candidate BPLs and RS transmitted from a candidate transmission beam direction in the second set of candidate BPLs.

Accordingly, in the FD, second beam-sweeping step illustrated in FIG. 9, the identified transmit beam directions include three beam directions for Tx (1) (e.g., Tx (1)(b), (c), and (d)) and four beam directions for Tx (2) (e.g., Tx (2)(a), (b), (d)) while four receive beam directions are identified for each of Rx (1) and Rx (2) (e.g., Rx (1)(b), (c), (d), and (e) and Rx (2)(a), (b), (d)). The FD, second beam-sweeping step includes 48 RS occasions, such that the first and second beam-sweeping steps may span (or consume) 98 RS occasions instead of the 125 RS occasions spanned by the beam sweeping process described above in relation to FIGS. 5 and 6.

In some aspects, the FD, second beam sweeping configuration specifies a set of transmit beam and reception beam combinations that can be used to identify a combination of (1) a BPL from the first set of candidate BPLs and (2) a BPL from the second set of candidate BPLs that may be used to establish a FD SL communication. For example, referring to FIGS. 8 and 10, the FD, second beam-sweeping configuration may specify a set of transmit beam and reception beam combinations (e.g., Tx (1)(b), Tx (2)(a), Rx (1)(b), Rx (2)(e); Tx (1)(b), Tx (2)(a), Rx (1)(c), (Rx (2)(e); etc.) based on the BPLs (e.g., combinations of transmission and reception beams) to select a reduced number of RS transmission and reception occasions based on the specific reception beam candidates for each combination of transmit beam directions. For example, transmission beam direction "b" for Tx (1) may be associated with reception beam directions "b" and "c" of Rx (1) and in the FD, second beam-sweeping step may transmit two RS, where a first RS is measured at Rx (1) via reception beam direction "b" and a second RS is measured at Rx (1) via reception beam direction "c" as in Rx (1) measurements 1012. Similarly, Rx (1) measurement occasion sets 1014 and 1016 each may include measurements via the two beam directions associated with Tx (1) beam directions "c" and "d" (e.g., Rx (1) beam directions "c"/"d" and "d"/"e", respectively).

Additionally, each transmit beam direction of Tx (2) included in a BPL in a set of candidate BPLs (e.g., beam directions "a", "b", "d", and "e") may be measured at Rx (2) via a set of beam directions associated with the transmit beam direction. Accordingly, Rx (2) may measure a RS associated with beam direction "a" transmitted by Tx (2) via reception beam direction "e" 1022 and RS associated with beam directions "b", "d", and "e" transmitted by Tx (2) via reception beam directions "a"/"b" 1024, "d"/"e" 1026, and "b" 1028, respectively. Measuring each BPL transmission beam direction in the sets of candidate BPLs via the reception beam direction(s) associated with the BPLs instead of measuring each BPL transmission beam direction via each of the reception beam directions associated with any BPL may further reduce the number of RS occasions in the two-step beam sweeping process. The FD, second beam-sweeping step of FIG. 10 may include 24 RS occasions, such that the first and second beam-sweeping steps may span (or consume) 74 RS occasions instead of the 98 (or 125 RS) occasions spanned by the beam sweeping process described above in relation to FIGS. 8 and 9 (or 5 and 6). In general, a set of N*N*M RS occasions (based on N transmission beam direction and M reception beam directions) may be reduced to $2*N*M+K_1*K_2*M'$ where $K_1$ and $K_2$ are a number of identified transmit beams (e.g., transmit beam directions) in a first and second set of candidate BPLs, respectively, and M' is a number of identified reception beams (e.g., reception beam directions) in the first and second set of candidate BPLs. As can be seen in FIGS. 8-10, the number of RS occasions may be reduced by 20-40% for the case of N=M=5, with greater reduction expected for larger numbers of possible transmission and/or reception directions.

UE 702 may receive FD beam sweeping RS measurement information 722 that may be transmitted by UE 704. In some aspects, UE 702 may also transmit, and UE 704 may also receive, FD beam sweeping RS measurement information 722. The FD beam sweeping RS measurement information 722 may include the raw data regarding the RS measurement (e.g., a RSRP, a RSRQ, or a SINR measured for each measured combination of BPLs). In some aspects, the FD beam sweeping RS measurement information 722 may include indications of BPLs that meet a first set of thresholds while experiencing self-interference that meets a second set of thresholds. Based on the measurements 720A/720B and the received FD beam sweeping RS measurement information 722, a first UE, e.g., UE 702 and/or UE 704, may establish 724 FD communication with the other UE, e.g., the UE 704 and/or UE 702.

Establishing 724 the FD communication may include determining whether the first UE 702 and the second UE 704 (via a first SL and a second SL) are capable of establishing SFFD communication. The determination may be based on (1) the measurements of at least one transmitted RS in the sets of RS 718 and at least one simultaneously-received RS that overlaps, in a set of frequency resources, with the at least one transmitted RS in the sets of RS 718 and (2) the FD beam sweeping RS measurement information 722 that UE 702 may receive from the second UE 704. For example, referring to FIG. 6, determining whether the first and second UEs are capable of SFFD may be based on the measurements of RS simultaneously received via time-and-frequency resources 662.

Establishing 724 the FD communication may also include determining whether the first UE 702 and the second UE 704 (via a first SL and a second SL) are capable of establishing SBFD communication. The determination may be based on (1) the measurements of at least one transmitted RS in the sets of RS 718 and at least one simultaneously-received RS that does not overlap, in a set of frequency resources, with the at least one transmitted RS in the sets of RS 718 and (2) the FD beam sweeping RS measurement information 722 that UE 702 may receive from the second UE 704. For example, referring to FIG. 6, determining whether the first and second UEs are capable of SBFD may be based on the measurements of RS simultaneously received via time-and-frequency resources 656 and 658 that do not overlap in the set of frequency resources.

In some aspects, UE 702 establishing 724 the FD communication may include selecting, based on the determined 716 configuration for FD beam training, the measurement 720A, and the FD beam sweeping RS measurement information 722, (1) a first BPL in the first set of candidate BPLs for a first SL and (2) a second BPL in the second set of candidate BPLs for a second SL that may be used to establish 724 the FD communication. For example, referring to FIGS. 8-10 and 4, the beam measurements associated with the BPL Tx (1)(d)/Rx (1)(d) and the measurements associated with the BPL Tx (2)(b)/Rx (2)(b) may indicate that both BPLs have signal strengths (e.g., a RSRP, a RSRQ, or a SINR) that meet a threshold signal strength and that the two BPLs experience SI that is below a threshold SI (e.g., as measured by a RSRP or a RSRQ). Accordingly, as in FIG. 4, UE 402 may transmit from TRP 410 using beam direction "d" 414 and UE 404 may receive the transmission from TRP 410 using TRP 420 in beam direction "d" 424. Additionally, UE 404 may transmit from TRP 440 using beam direction "b" 442 and UE 402 may receive the transmission from TRP 440 using TRP 430 in beam direction "b" 432.

Figure 11:
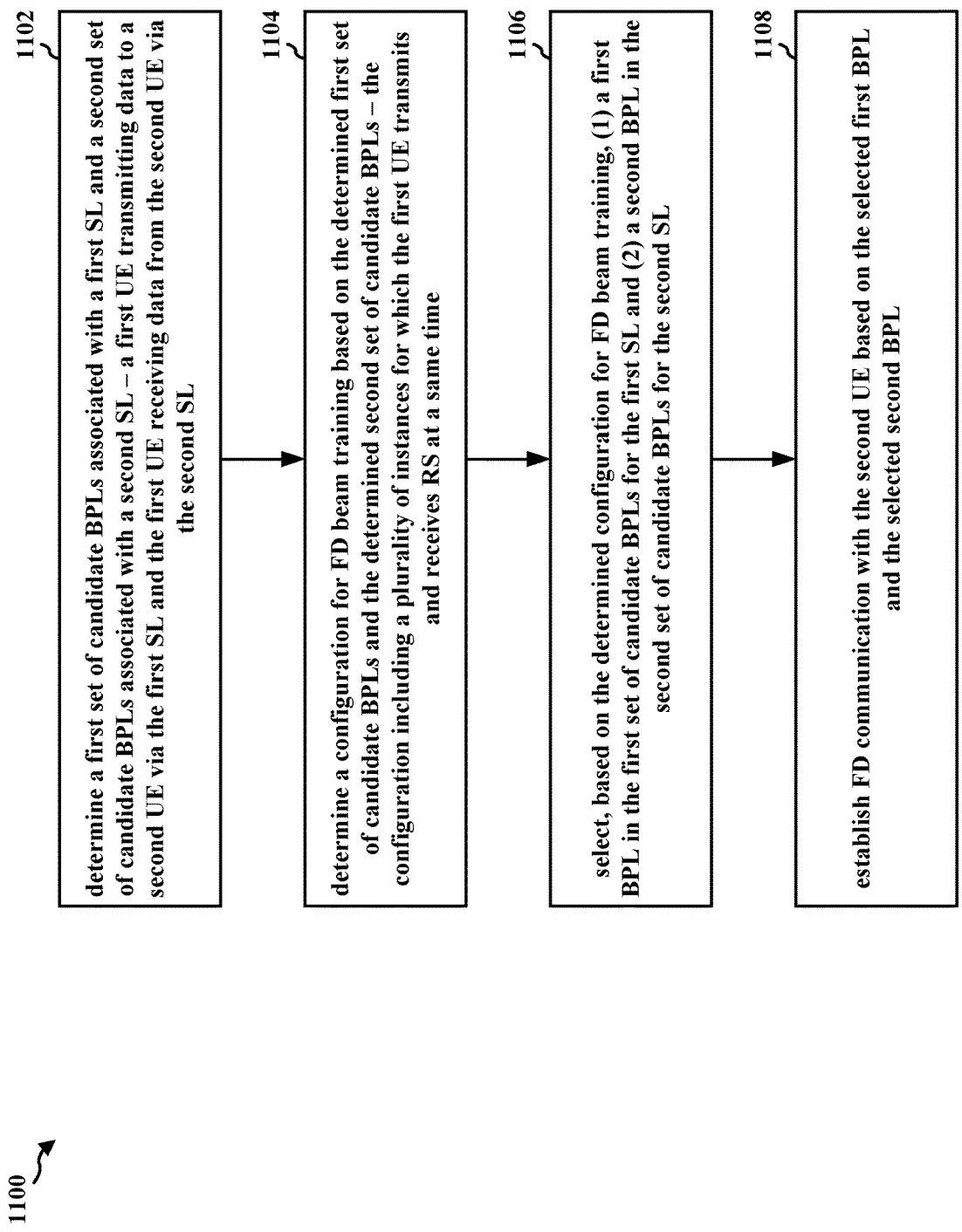
FIG. 11 is a flowchart of a method of wireless communication.

FIG. 11 is a flow chart 1100 of a method of wireless communication. The method may be performed by a first UE (e.g., the UE 104; the UE 402; the UE 702; the apparatus 1502). The method may reduce the number of RS used to perform beam sweeping. At 1102, the UE may determine (1) a first set of candidate BPLs associated with a first SL and (2) a second set of candidate BPLs associated with a second SL. The first UE may transmit data to a second UE via the first SL and may receive data from the second UE via the second SL. For example, referring to FIGS. 7 and 8, a first UE 702 may determine a first set of candidate BPLs for a first SL communication (e.g., Tx (1) to Rx (1)) to include BPLs {Tx (1)(b), Rx (1)(b)}; {Tx (1)(b), Rx (1)(c)}; {Tx (1)(c), Rx (1)(c)}; {Tx (1)(c), Rx (1)(d)}; {Tx (1)(d), Rx (1)(d)}; and {Tx (1)(d), Rx (1)(e)}. The first UE may further determine a second set of candidate BPLs for a second SL communication (e.g., Tx (2) to Rx (2)) to include BPLs {Tx (2)(a), Rx (2)(e)}; {Tx (2)(b), Rx (2)(a)}; {Tx (2)(b), Rx (2)(b)}; {Tx (2)(d), Rx (2)(d)}; {Tx (2)(d), Rx (2)(e)}; and {Tx (2)(e), Rx (2)(b)}. For example, 1102 may be performed by candidate BPL determination component 1540.

Figure 12:
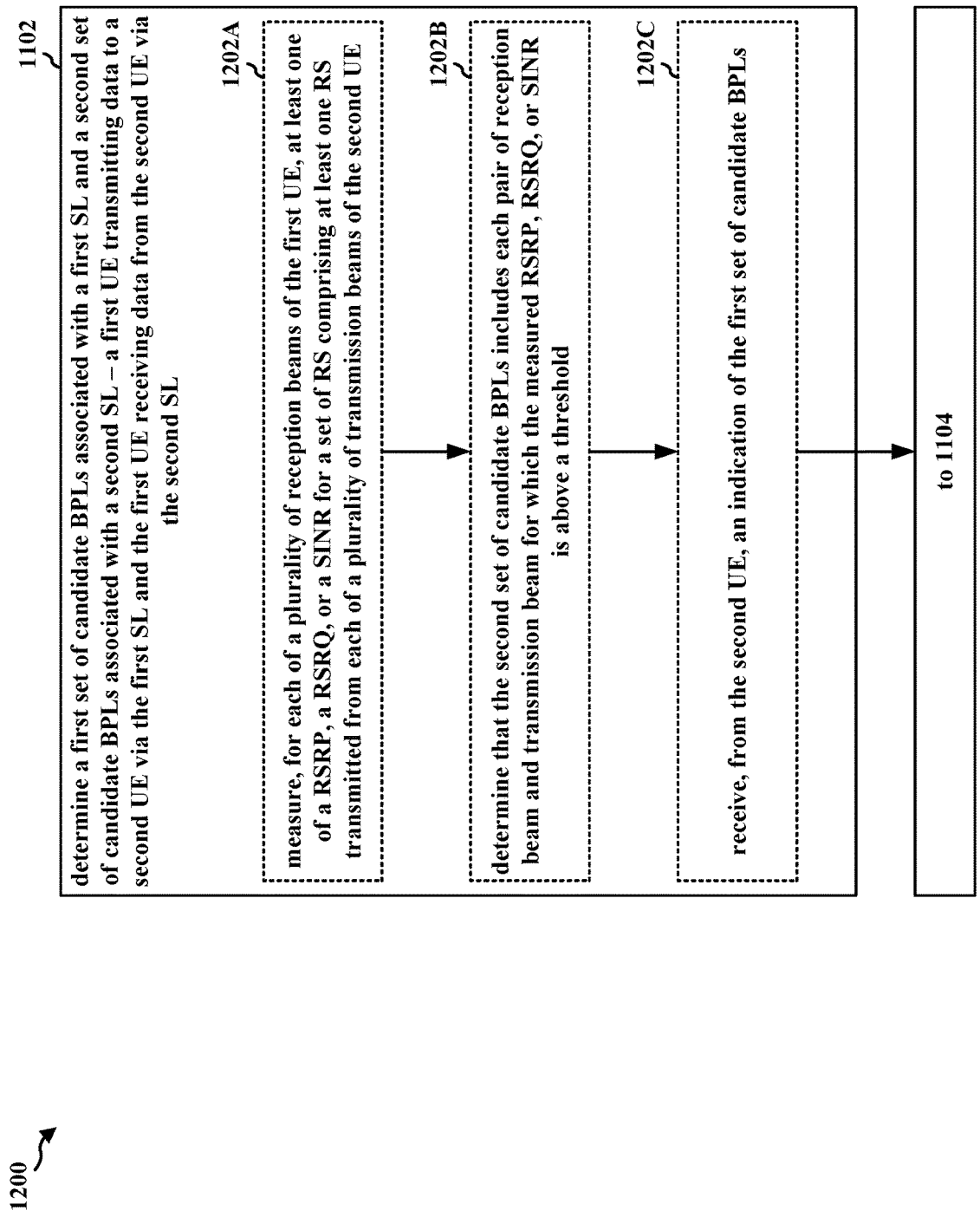
FIG. 12 is a flowchart of substeps of a step of FIG. 11.

FIG. 12 is a flowchart 1200 of substeps of step 1102 of FIG. 11. Optional aspects are illustrated with a dashed line. At 1202A, the first UE may measure, for each of multiple reception beams of the first UE, at least one of a RSRP, a RSRQ, or a SINR for a set of RS including at least one RS transmitted from each of multiple transmission beams of the second UE. For example, referring to FIGS. 7 and 8, a first UE (e.g., UE 702) may receive a set of at least one RS via each transmission beam direction for each reception beam direction 710 and may measure 712A a signal strength (e.g., a RSRP, a RSRQ, or a SINR) for the set of RS 710 received via each reception beam associated with reception (Rx) TRP 702a. As illustrated in FIG. 8, for each particular transmission beam direction "a" through "e" associated with a transmission (Tx) TRP 704b, a first UE (e.g., UE 702) may measure a signal strength (e.g., a RSRP, a RSRQ, or a SINR) via each reception beam direction "a" through "e" associated with a reception (Rx) TRP 702a. For example, 1202A may be performed by candidate BPL determination component 1540.

At 1202B, the first UE may determine that a second set of candidate BPLs includes each pair of reception beam and transmission beam for which the RSRP, the RSRQ, or the SINR measured at 1202A is above a threshold. The threshold may be pre-configured based on a signal strength below which communication is unreliable or results in an unacceptable block error rate (BLER). In some aspects, the threshold is determined based on at least one of a RSRP, a RSRQ, or a SINR measured for at least one BPL in the second set of candidate BPLs. For example, the threshold may be determined such that no more than a first number of candidate BPLs is determined to be included in the second set of candidate BPLs. In some aspects, the threshold is determined based on a maximum of at least one of a RSRP, a RSRQ, or a SINR measured for the at least one BPL in the second set of candidate BPLs. For example, a threshold may be determined based on a highest measured RSRP, RSRQ, or SINR multiplied by a value between 0 and 1. For example, referring to FIGS. 7 and 8, the first UE may determine that at least one of a RSRP, a RSRQ, or a SINR measured 712A for BPLs {Tx (2)(a), Rx (2)(e)}; {Tx (2)(b), Rx (2)(a)} (e.g., 824); {Tx (2)(b), Rx (2)(b)} (e.g., 826); {Tx (2)(d), Rx (2)(d)}; {Tx (2)(d), Rx (2)(e)}; and {Tx (2)(e), Rx (2)(b)} is above a threshold. For example, 1202B may be performed by candidate BPL determination component 1540.

At 1202C, the first UE may receive, from the second UE, an indication of the first set of candidate BPLs. The indication of the first set of candidate BPLs may be based on measurements of transmissions from the first UE that may be received at the second UE. The indication of the first set of candidate BPLs may include a set of measurement data for each of the BPLs identified/measured at the second UE. In some aspects, the indication of the first set of candidate BPLs may include an identification of BPLs with or without the associated measurement data. The first set of candidate BPLs may then be determined based on the received indication. For example, referring to FIGS. 7 and 8, signal strength measurement information 714 may be transmitted by UE 704 and may be received at UE 702. The signal strength measurement information 714 may include an indication that the UE 704 has determined BPLs {Tx (1)(b), Rx (1)(b); Tx (1)(b), Rx (1)(c); Tx (1)(c), Rx (1)(c); Tx (1)(c), Rx (1)(d); Tx (1)(d), Rx (1)(d); Tx (1)(d), Rx (1)(e)} to be included in the first set of candidate BPLs and/or the measured signal strength values for the BPLs. For example, 1202C may be performed by candidate BPL determination component 1540.

Accordingly, the determination 1102 of (1) a first set of candidate BPLs associated with a first SL and (2) a second set of candidate BPLs associated with a second SL may be based on measuring 1202A the RSRP, the RSRQ, or the SINR of a first set of RS received at the first UE, determining the second set of candidate BPLs as including the BPLs for which the measured signal strength value is above a threshold, and determining the first set of candidate BPLs based on the indication of the first set of candidate BPLs that the first UE may receive from the second UE. For example, referring to FIGS. 7 and 8, a first UE (e.g., UE 702) may determine the second set of candidate BPLs based on measuring 712A the reference signals, while the first UE (e.g., UE 702) may receive the signal strength measurement information 714 from the second UE (e.g., UE 704) and may determine the first set of candidate BPLs based on the received signal strength measurement information 714.

After determining the first set of candidate BPLs associated with the first SL and the second set of candidate BPLs associated with the second SL, the first UE, at 1104, may determine a configuration for FD beam training based on the determined first set of candidate BPLs and the determined second set of candidate BPLs. In some aspects, the configuration for FD beam training includes multiple instances for which the first UE transmits and receives RS at a same time. For example, the FD beam training configuration may include instances for which the UE may transmit RS from a first (transmission) TRP and may receive a set of transmitted RS at a second (reception) TRP. The FD beam training configuration may include RS configurations for at least one BPL in the first set of candidate BPLs and the second set of candidate BPLs. The FD beam training (or sweeping) configuration, in some aspects, may identify and/or specify every possible combination of transmit beams identified as belonging to at least one BPL in a set of candidate BPLs at every single receive beam identified as belonging to at least one BPL in a set of candidate BPLs. In some aspects, the FD beam training (or sweeping) configuration may specify a set of transmit beam and reception beam combinations based on the BPLs (e.g., combinations of transmission and reception beams) to select a reduced number of RS transmission and reception occasions based on the specific reception beam candidates for each combination of transmit beam directions of the first and second sets of candidate BPLs. For example, 1104 may be performed by FD beam sweeping configuration component 1542.

For example, referring to FIGS. 9 and 10, the FD beam training configuration may include simultaneous RS transmissions from a combination of (1) a transmission beam direction of each of Tx (1)(b), Tx (1)(c), and Tx (1)(d) and (2) a transmission beam direction of each of Tx (2)(a), (b), (d), and (e). The different combinations of transmitted RS may be measured by each reception beam direction of a BPL in either the first set of candidate BPLs or the second set of candidate BPLs as in FIG. 9 in which each combination of transmitted RS is measured by each of 4 reception beam directions of a first reception TRP of UE2 and a second reception TRP of a UE1. In some aspects, each combination of transmitted RS may be measured by each reception beam direction associated with a corresponding beam direction of either of the transmit beam directions of the transmitted RS as illustrated in FIG. 10 in which each combination of transmitted RS is measured by (1) a reception beam direction(s) of a first reception TRP of UE2 associated with the transmission beam direction of the corresponding first transmission TRP of UE1 and (2) a reception beam direction(s) of a second reception TRP of UE1 associated with the transmission beam direction of the corresponding second transmission TRP of UE2.

In some aspects, the configuration for FD beam training comprises at least one of a transmission configuration indicator (TCI) indicating a quasi-co-location (QCL) associated with each of the beams in the first set of candidate BPLs and the second set of candidate BPLs. The TCI indicating the QCL may identify the transmission beam directions and reception beam directions associated with the different combinations of transmission beams and reception beams illustrated in FIGS. 9 and 10 (e.g., Tx (1)(b), Tx (2)(a), Rx (1)(b), Rx (2)(e); Tx (1)(b), Tx (2)(a), Rx (1)(c), Rx (2)(e); etc.).

Figure 13:
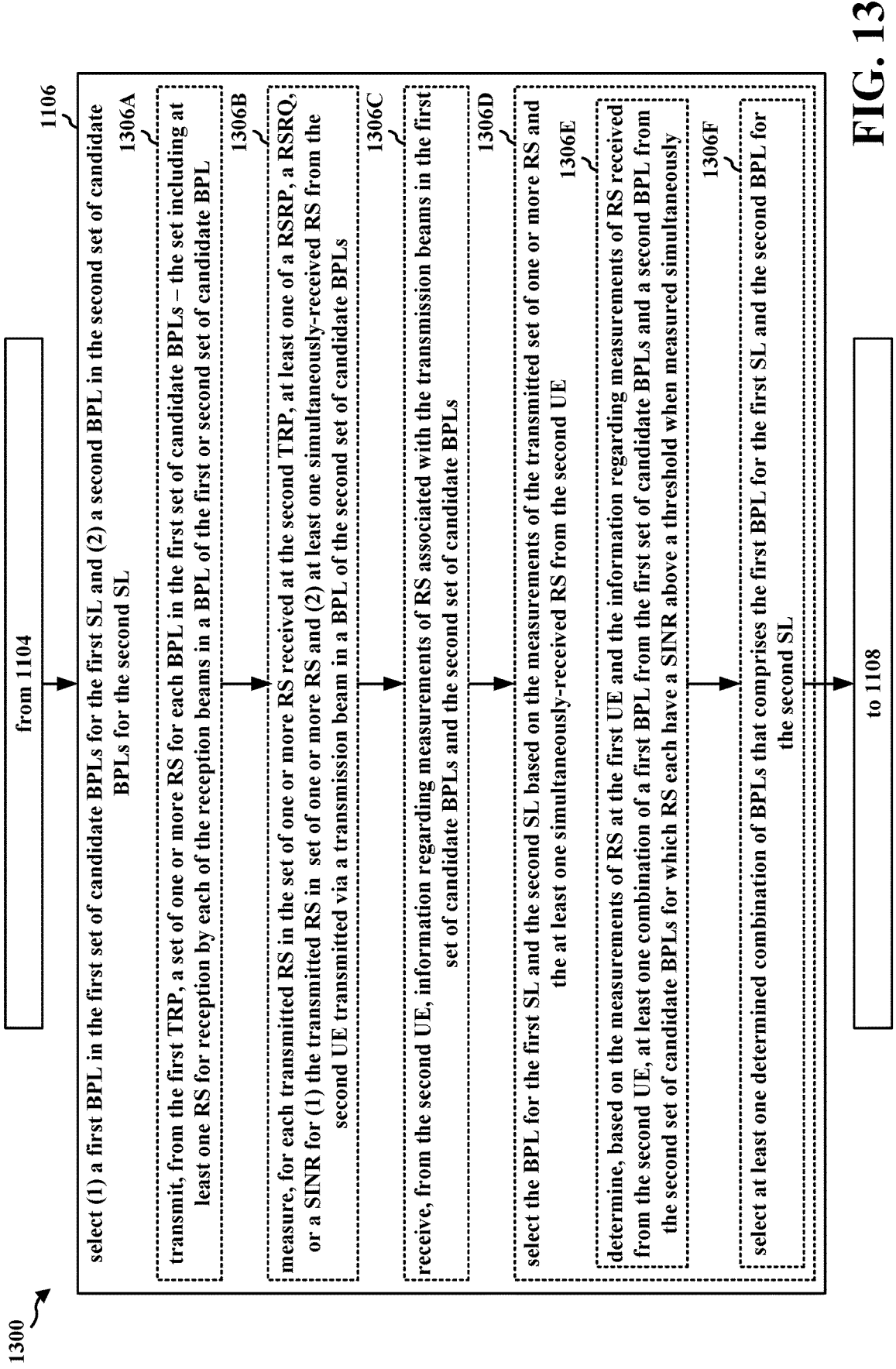
FIG. 13 is a flowchart of substeps of a step of FIG. 11.

At 1106, the first UE may select, based on the FD beam training configuration determined at 1104, (1) a first BPL in the first set of candidate BPLs for the first SL and (2) a second BPL in the second set of candidate BPLs for the second SL. For example, 1106 may be performed by BPL selection component 1544. FIG. 13 is a flowchart 1300 of substeps of step 1106 of FIG. 11. Optional aspects are illustrated with a dashed line. In order to select, at 1106, the first and second BPLs, the first UE, at 1306A, may transmit, from a first (transmission) TRP, a set of one or more RS for each BPL in the first set of candidate BPLs. The set of one or more RS that the first UE may transmit may include at least one RS for reception by each of the reception beams in a BPL of the first set of candidate BPLs and the second set of candidate BPLs. For example, referring to FIGS. 9 and 10, a first UE, UE1, may transmit a set of RS via each transmission beam direction in a BPL in the first set of candidate BPLs (directions "b" through "d") for reception by each of the reception beams in a set of BPLs from the first and second set of candidate BPLs as illustrated in FIGS. 9 and 10 and as described above. For example, 1306A may be performed by BPL selection component 1544.

At 1306B, the first UE may measure, for each transmitted RS in the set of one or more RS that the first UE may receive at a second (reception) TRP, at least one of a RSRP, a RSRQ, or a SINR for (1) the transmitted set of one or more RS and (2) at least one simultaneously-received RS that may be transmitted, from a second UE, via a transmission beam in a BPL of the second set of candidate BPLs. For example, referring to FIGS. 7 and 9, a first UE, UE1, may transmit a set of 16 RS via transmission beam direction "d" associated with a first transmission (Tx) TRP (e.g., Tx TRP 702*b*) during a time interval in which a second UE, UE2, may transmit a set of 4 RS for each of 4 transmission beam directions "a", "b", "d", and "e". The first UE may simultaneously receive (e.g., during a RS reception occasion in RS reception occasion set 924) a RS in the set of 16 RS transmitted by the first UE, UE1, via transmission beam direction "d" (e.g., Tx (1)(d)) and a RS in a set of 4 RS transmitted by the second UE, UE2, via transmission beam direction "b" (e.g., Tx (2)(b)) via a particular reception beam direction "a", "b", "d", or "e" (e.g., Rx (2)(a), (b), (*d*), or (e)) of a reception (Rx) TRP of the first UE. Similarly, referring to FIGS. 7 and 10, a first UE, UE1, may transmit a set of 8 RS via transmission beam direction "d" associated with a first transmission (Tx) TRP (e.g., Tx TRP 702*b*) during a time interval in which a second UE, UE2, may transmit a set of 2 RS for each of 4 transmission beam directions "a", "b", "d", and "e". The first UE may simultaneously receive (e.g., during a RS reception occasion in RS reception occasion set 1024) a RS in the set of 8 RS transmitted by the first UE, UE1, via transmission beam direction "d" (e.g., Tx (1)(*d*)) and a RS in a set of 2 RS transmitted by the second UE, UE2, via transmission beam direction "b" (e.g., Tx (2)(b)) via a particular reception beam direction "a" or "b" (e.g., (Rx (2)(a) or (b)) of a reception (Rx) TRP of the first UE (e.g., Rx TRP 702*a*). For example, 1306B may be performed by BPL selection component 1544.

At 1306C, the first UE may receive, from the second UE, information regarding measurements of RS associated with the transmission beams in the first set of candidate BPLs and the second set of candidate BPLs. For example, referring to FIG. 7, a first UE, UE 702, may receive FD beam sweeping RS measurement information 722 that may be transmitted by a second UE, UE 704. The FD beam sweeping RS measurement information 722 (e.g., information regarding measurements of RS associated with the transmission beams in the first set of candidate BPLs and the second set of candidate BPLs) may include the raw data regarding the RS measurement (e.g., a RSRP, a RSRQ, or a SINR measured for each measured combination of BPLs). In some aspects, the FD beam sweeping RS measurement information 722 includes indications of BPLs that meet a first set of signal-strength and/or signal quality thresholds while experiencing SI that meets a second set of SI thresholds.

At 1306D, the first UE may select the first BPL for the first SL and the second BPL for the second SL based on the measurements of the transmitted set of one or more RS and the at least one simultaneously-received RS from the second UE. In some aspects the selection of the first BPL for the first SL and the second BPL for the second SL may also be based on the information that the first UE may receive at 1306C. To select, at 1306D, the first and second BPLs, the first UE may determine, at 1306E, based on the measurements of RS at the first UE, at 1306B, and the information regarding measurements of RS received from the second UE, at 1306C, at least one combination of a first BPL from the first set of candidate BPLs and a second BPL from the second set of candidate BPLs for which RS each have a SINR above a threshold when measured simultaneously. For example, referring to FIGS. 4, 7, 9, and 10, a first UE (e.g., UE 402/702 or UE1) based on the measurements made at RS reception occasions 912-918 (or during RS reception occasion set 1024), the first UE (e.g., UE 402/702 or UE1) may determine that the combination of BPLs (Tx (1)(d), Rx (1)(d)) and (Tx (2)(b), Rx (2)(b)) each have a SINR above a threshold when measuring RS simultaneously transmitted by the first UE (e.g., UE 402/702 or UE1) via transmission beam direction Tx (1)(d) and by a second UE (e.g., UE 404/704 or UE2) via transmission beam direction Tx (2)(b) (e.g., during RS reception occasions 912-918 or 1032 and 1034). The determination may further be based on similar information regarding RS measurements performed at the second UE (e.g., UE 404/704 or UE2) that the first UE (e.g., UE 402/702 or UE1) may receive from the second UE (e.g., UE 404/704 or UE2).

In some aspects, there may be additional combinations of a first BPL from the first set of candidate BPLs and a second BPL from the second set of candidate BPLs for which RS each have a SINR above a threshold when transmitting and receiving RS via the determined first and second BPLs simultaneously. For example, referring to FIGS. 8-10, the first and second sets of candidate BPLs may each contain 6 candidate BPLs (e.g., {Tx (1)(b), Rx (1)(b); Tx (1)(b), Rx (1)(c); Tx (1)(c), Rx (1)(c); Tx (1)(c), Rx (1)(d); Tx (1)(d), Rx (1)(d); Tx (1)(d), Rx (1)(e)} and {Tx (2)(a), Rx (2)(e); Tx (2)(b), Rx (2)(a); Tx (2)(b), Rx (2)(b); Tx (2)(d), Rx (2)(d); Tx (2)(d), Rx (2)(e); Tx (2)(e), Rx (2)(b)}). A set of 36 combinations may be made from the first and second sets of 6 candidate BPLs. Of the 36 possible combinations of BPLs from the first set of candidate BPLs and the second set of candidate BPLs, the first UE may determine, at 1306E, that a SINR of RS measured at the first and second UE received based on the combination of BPLs is above a threshold when transmitting and receiving RS via the determined first and second BPLs simultaneously for 26 of the combinations of BPLs. For example, 1306D and 1306E may be performed by BPL selection component 1544.

After determining the at least one combination of a first BPL from the first set of candidate BPLs and a second BPL from the second set of candidate BPLs, the first UE may select, at 1306F, at least one determined combination of BPLs that comprises the first BPL for the first SL and the second BPL for the second SL. The selection may be based on a combined measure of signal strength or signal quality (e.g., a RSRP, RSRQ, or a SINR). The combined measure of signal strength and/or signal quality may be an average of a signal strength and/or signal quality measured separately for each of the two BPLs in a BPL combination. The average may be, e.g., an arithmetic average or a geometric average. A metric (e.g., the average signal quality of the combination of BPLs) may be associated with each combination of BPLs such that the combinations can be ranked. Selecting the first and second BPLs for the first and second SLs may then include selecting a first and second BPL in a BPL combination with a highest (or lowest) ranking (or metric). For example, referring to FIGS. 4, 7, and 8-10, a first UE (e.g., 402/702) may select a first BPL for a first SL 450 including Tx (1)(d) 414 and Rx (1)(d) 424 and a second BPL for a second SL 460 including Tx (2)(b) 442 and Rx (2)(b) based on the measurements 712A as illustrated in FIG. 8 and the measurements 720A as illustrated in FIG. 9 or 10. For example, 1306D and 1306F may be performed by BPL selection component 1544.

Figure 14:
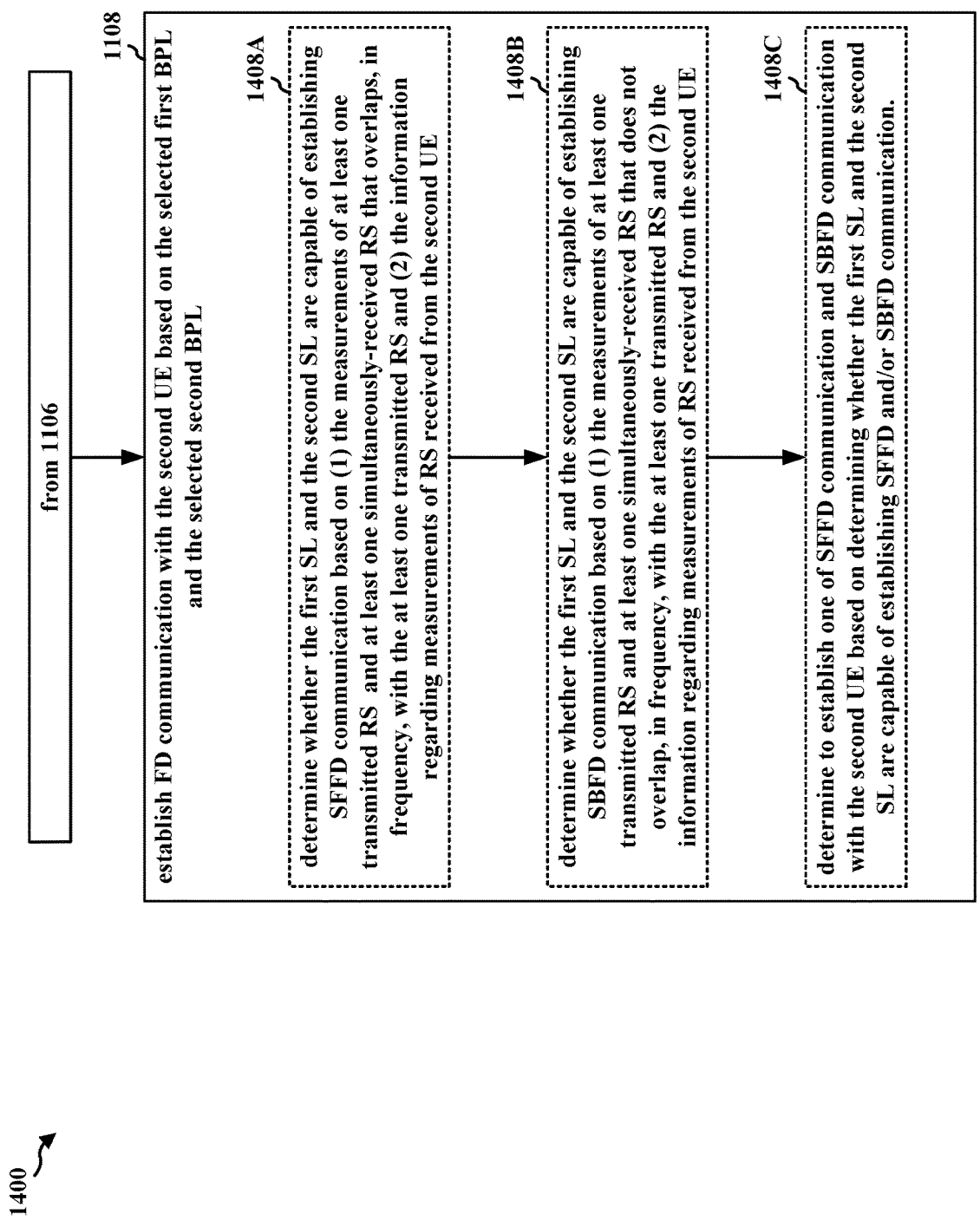
FIG. 14 is a flowchart of substeps of a step of FIG. 11.

At 1108, the first UE may establish FD communication with the second UE based on the selected first BPL and the selected second BPL. FIG. 14 is a flowchart 1400 of sub steps of step 1108 of FIG. 11. In establishing the FD communication at 1108, the first UE may determine, at 1408A, whether the first SL and the second SL are capable of establishing SFFD communication based on (1) the measurements of at least one transmitted RS in the set of one or more RS and the at least one simultaneously-received RS that overlaps, in the set of available frequency resources, with the at least one transmitted RS in the set of one or more RS and (2) the information regarding measurements of RS received from the second UE. The determination may also be performed during the selection process and the result of the determination may contribute to the metric used to rank the combinations of BPLs determined at 1306E. Being capable of SFFD communication may increase a metric by an additive or multiplicative factor (e.g., make a combination of BPLs more desirable). For example, referring to FIGS. 6, 7, 9, and 10, the first UE (and the second UE) may measure RS transmitted by both the first UE (e.g., UE 702 or UE1) and the second UE (e.g., UE 704 or UE2) in a same (e.g., overlapping) time-and frequency resource (e.g., time-and-frequency resource 662) during a FD beam sweeping operation as illustrated in FIGS. 9 and 10. The first UE may then determine based on the RS measurements whether the first SL and the second SL are capable of establishing SFFD communication. The first UE may determine that the SI at a reception TRP via a particular reception beam direction experienced when transmitting from a first TRP via a particular transmission beam direction is below (or above) a threshold and determine that the first SL and second SL using the particular transmission and reception beam directions may be capable (or incapable) of SFFD communication. For example, 1408A may be performed by FD communication establishment component 1546.

In establishing the FD communication at 1108, the first UE may also determine, at 1408B, whether the first SL and the second SL are capable of establishing SBFD communication based on (1) the measurements of at least one transmitted RS in the set of one or more RS and the at least one simultaneously-received RS that does not overlap, in the set of available frequency resources, with the at least one transmitted RS in the set of one or more RS and (2) the information regarding measurements of RS received from the second UE. The determination may also be performed during the selection process and the result of the determination may contribute to the metric used to rank the combinations of BPLs determined at 1306E. Being capable of SBFD communication may increase a metric by an additive or multiplicative factor (e.g., make a combination of BPLs more desirable). An additive or multiplicative factor associated with being capable of SBFD communication may be smaller than an additive or multiplicative factor associated with being capable of SFFD communication. For example, referring to FIGS. 6, 7, 9, and 10, the first UE (and the second UE) may measure RS transmitted by both the first UE (e.g., UE 702 or UE1) and the second UE (e.g., UE 704 or UE2) in different (e.g., non-overlapping) time- and frequency resource (e.g., time-and-frequency resource sets 656 and 658) during a FD beam sweeping operation as illustrated in FIGS. 9 and 10. The first UE may then determine based on the RS measurements whether the first SL and the second SL are capable of establishing SBFD communication. The first UE may determine that the SI (between different frequency resources) at a reception TRP via a particular reception beam direction experienced when transmitting from a first TRP via a particular transmission beam direction is below (or above) a threshold and determine that the first SL and second SL using the particular transmission and reception beam directions may be capable (or incapable) of SBFD communication For example, 1408B may be performed by FD communication establishment component 1546.

The first UE, at 1408C may determine to establish one of SFFD communication and SBFD communication with the second UE based on at least one of (1) the determination whether the first SL and the second SL are capable of establishing SFFD, at 1408A, and (2) the determination whether the first SL and the second SL are capable of establishing SBFD communication, at 1408B. After determining, at 1408C, to establish one of SFFD communication and SBFD communication with the second UE, the first UE may establish FD communication between the first UE and the second UE via the first BPL for the first SL and the second BPL for the second SL. For example, 1108 and 1408C may be performed by FD communication establishment component 1546.

Figure 15:
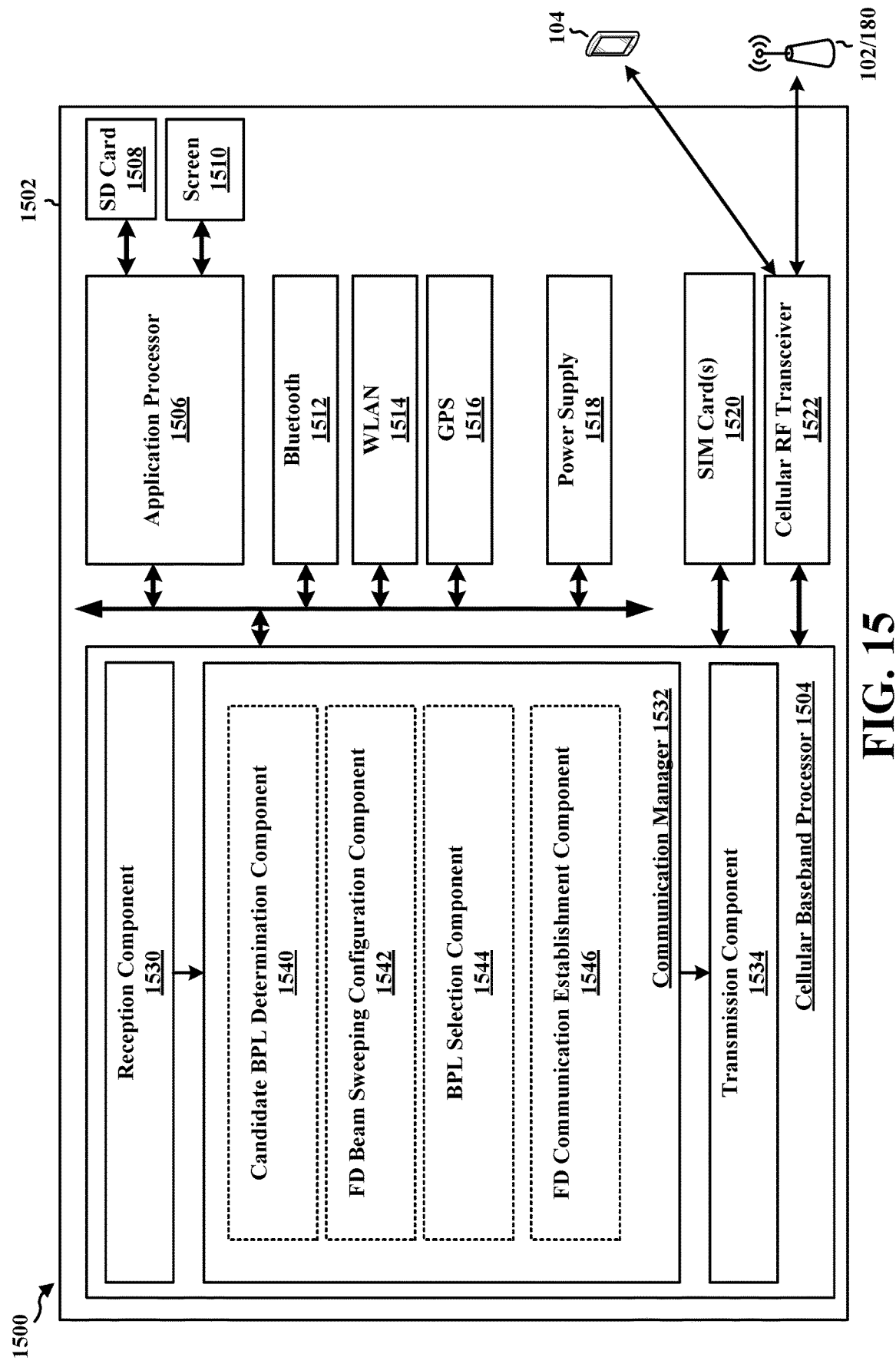
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a candidate BPL determination component 1540 that may be configured to determine (1) a first set of candidate BPLs associated with a first SL and (2) a second set of candidate BPLs associated with a second SL, where the first UE transmits data to a second UE via the first SL and the first UE receives data from the second UE via the second SL, e.g., as described in connection with 1102 of FIG. 11 and 1202A-1202C of FIG. 12. The communication manager 1532 may further include a FD beam sweeping configuration component 1542 that receives input in the form of the determined first set of candidate BPLs and the determined second set of candidate BPLs from the component 1540 and may be configured to determine a configuration for FD beam training based on the determined first set of candidate BPLs and the determined second set of candidate BPLs where the configuration for FD beam training includes multiple instances for which the first UE transmits and receives RS at a same time, e.g., as described in connection with 1104 of FIG. 11. The communication manager 1532 may further include a BPL selection component 1544 that receives input in the form of the determined FD beam training configuration from the component 1542 and may be configured to select, based on the determined configuration for FD beam training, (1) a first BPL in the first set of candidate BPLs for the first SL and (2) a second BPL in the second set of candidate BPLs for the second SL, e.g., as described in connection with 1106 of FIG. 11 and 1306A-1306F of FIG. 13. The communication manager 1532 may further include a FD communication establishment component 1546 that receives input in the form of the selected first BPL and the selected second BPL from the component 1544 and may be configured to establish FD communication with the second UE based on the selected first BPL and the selected second BPL, e.g., as described in connection with 1108 of FIG. 11 and 1408A-1408C of FIG. 14.

The apparatus may include additional components that perform each of the blocks of the algorithm in the aforementioned flowcharts of FIGS. 11-14. As such, each block in the aforementioned flowcharts of FIGS. 11-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for determining (1) a first set of candidate BPLs associated with a first SL and (2) a second set of candidate BPLs associated with a second SL, where the first UE transmits data to a second UE via the first SL and the first UE receives data from the second UE via the second SL. In one configuration, the apparatus 1502, and in particular the cellular baseband processor 1504, includes means for measuring, for each of a plurality of reception beams of the first UE, at least one of a RSRP, a RSRQ, or a SINR for a set of RS including at least one RS transmitted from each of a plurality of transmission beams of the second UE. In one configuration, the apparatus 1502, and in particular the cellular baseband processor 1504, includes means for determining that the second set of candidate BPLs includes each pair of reception beam and transmission beam for which the measured RSRP, RSRQ, or SINR is above a threshold. In one configuration, the apparatus 1502, and in particular the cellular baseband processor 1504, includes means for receiving, from the second UE, an indication of the first set of candidate BPLs. In one configuration, the apparatus 1502, and in particular the cellular baseband processor 1504, includes means for determining a configuration for FD beam training based on the determined first set of candidate BPLs and the determined second set of candidate BPLs, the configuration for FD beam training comprising a plurality of instances for which the first UE transmits and receives RS at a same time. In one configuration, the apparatus 1502, and in particular the cellular baseband processor 1504, includes means for selecting, based on the determined configuration for FD beam training, (1) a first BPL in the first set of candidate BPLs for the first SL and (2) a second BPL in the second set of candidate BPLs for the second SL. In one configuration, the apparatus 1502, and in particular the cellular baseband processor 1504, includes means for transmitting, from a first TRP, a set of one or more RS for each BPL in the first set of candidate BPLs, the set of one or more RS comprising at least one RS for reception by each of the reception beams in a BPL of the first set of candidate BPLs and the second set of candidate BPLs. In one configuration, the apparatus 1502, and in particular the cellular baseband processor 1504, includes means for measuring, for each transmitted RS in the set of one or more RS received at a second TRP, at least one of a RSRP, a RSRQ, or a SINR for (1) the transmitted set of one or more RS and (2) at least one simultaneously-received RS from the second UE, the at least one simultaneously-received RS being transmitted via a transmission beam in a BPL of the second set of candidate BPLs. In one configuration, the apparatus 1502, and in particular the cellular baseband processor 1504, includes means for receiving, from the second UE, information regarding measurements of RS associated with the transmission beams in the first set of candidate BPLs and the second set of candidate BPLs. In one configuration, the apparatus 1502, and in particular the cellular baseband processor 1504, includes means for selecting the first BPL for the first SL and the second BPL for the second SL based on the measurements of the transmitted set of one or more RS and the at least one simultaneously-received RS from the second UE. In one configuration, the apparatus 1502, and in particular the cellular baseband processor 1504, includes means for determining, based on the measurements of RS at the first UE and the information regarding measurements of RS received from the second UE, at least one combination of a first BPL from the first set of candidate BPLs and a second BPL from the second set of candidate BPLs for which RS each have a SINR above a threshold when transmitting and receiving RS via the determined first and second BPLs simultaneously. In one configuration, the apparatus 1502, and in particular the cellular baseband processor 1504, includes means for selecting at least one determined combination of BPLs that includes the first BPL for the first SL and the second BPL for the second SL. In one configuration, the apparatus 1502, and in particular the cellular baseband processor 1504, includes means for establishing FD communication with the second UE based on the selected first BPL and the selected second BPL. In one configuration, the apparatus 1502, and in particular the cellular baseband processor 1504, includes means for determining whether the first SL and the second SL are capable of establishing SFFD communication based on (1) the measurements of at least one transmitted RS in the set of one or more RS and the at least one simultaneously-received RS that overlaps, in the set of available frequency resources, with the at least one transmitted RS in the set of one or more RS and (2) the information regarding measurements of RS received from the second UE. In one configuration, the apparatus 1502, and in particular the cellular baseband processor 1504, includes means for determining whether the first SL and the second SL are capable of establishing SBFD communication based on (1) the measurements of at least one transmitted RS in the set of one or more RS and the at least one simultaneously-received RS that does not overlap, in the set of available frequency resources, with the at least one transmitted RS in the set of one or more RS and (2) the information regarding measurements of RS received from the second UE. In one configuration, the apparatus 1502, and in particular the cellular baseband processor 1504, includes means for determining to establish one of SFFD communication and SBFD communication with the second UE based on at least one of (1) the determining whether the first SL and the second SL are capable of establishing SFFD and (2) the determining whether the first SL and the second SL are capable of establishing SBFD communication. The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In some aspects of wireless communication, e.g., 5G NR, UEs (e.g., vehicles) may have multiple TRPs. For example, a car may have front and rear antenna panels, while larger vehicles, like trucks and trailers, may have more than two TRPs. The TRPs may be configured as different RF modules with shared hardware/software controller. Because the TRPs of vehicles may be separated by a significant distance (e.g., 4 or more meters), each of the TRPs may receive and/or transmit for a particular channel differently due to (1) differences in distance from a transmitter and/or receiver, (2) differences in whether the different TRPs have a LOS (or do not have line of sight (NLOS)) with the transmitter and/or receiver, (3) blocking, etc. Accordingly, FD V2V or V2X communication may be feasible for a UE (e.g., a vehicle) equipped with multiple spatially separated TRPs.

Specifically, a UE may be able to receive using a first TRP while transmitting using a second TRP. Alternatively, or additionally, FD V2X communication may be feasible for a large antenna panel by using a first set of antenna elements of the panel to receive communications while using a second set of antenna elements of the panel to transmit communications. In either case, FD communication may be SFFD or SBFD, where SFFD allows transmission and reception using a same frequency resource to receive and transmit at a same time and SBFD allows transmission and reception at a same time using different frequency resources.

In some aspects of wireless communication, e.g., 5G NR, a beam training mechanism for use in connection with transmission/reception beamforming (e.g., for FR2) may specify, for a transmitter and/or receiver, a first beam sweeping mechanism and a second beam refinement mechanism. The transmitter and/or receiver may perform beam sweeping to determine a best BPL. Beam refinement may be performed by the transmitter and/or receiver to further improve the connection by selecting a narrower beam.

Beam sweeping, in some aspects, may be used to identify a most suitable or best combination of transmission beam and reception beam (e.g., based on signal strength or quality). In some aspects, the beam sweeping may be performed before an RRC connection is established between the transmitting and receiving UEs and may use a beam sweeping configuration that is common to (or known by) both the transmitting and receiving UEs. For example, a transmitting UE (e.g., a first TRP of the transmitting UE) may transmit in N different directions while a receiving UE (e.g., a second TRP of the receiving UE) may receive using M different receiving beam directions. The receiver may then measure the N*M BPLs, and select the best one (e.g., the BPL with the highest RSRP, RSRQ, or SINR). Using a similar beam sweeping methodology for SL FD communication may result in N*N*M different combinations of transmit beams and receive beams. It may be beneficial to avoid having to test every possible combination in order to determine a pair of BPLs that can best support SL FD communication. Accordingly, the two-step FD beam training process presented above in relation to FIGS. 4-15 provides a reduced number of combinations to test in order to determine a pair of BPLs that can best support SL FD communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication for a first UE, including determining (1) a first set of candidate BPLs associated with a first SL, the first UE transmitting data to a second UE via the first SL and (2) a second set of candidate BPLs associated with a second SL, the first UE receiving data from the second UE via the second SL; determining a configuration for FD beam training based on the determined first set of candidate BPLs and the determined second set of candidate BPLs, the configuration for FD beam training comprising a plurality of instances for which the first UE transmits and receives RS at a same time; selecting, based on the determined configuration for FD beam training, (1) a first BPL in the first set of candidate BPLs for the first SL and (2) a second BPL in the second set of candidate BPLs for the second SL; and establishing FD communication with the second UE based on the selected first BPL and the selected second BPL.

Aspect 2 is the method of aspect 1, where determining the second set of candidate BPLs associated with the second SL includes measuring, for each of a plurality of reception beams of the first UE, at least one of a RSRP, a RSRQ, or a SINR for a set of RS including at least one RS transmitted from each of a plurality of transmission beams of the second UE; and determining that the second set of candidate BPLs includes each pair of reception beam and transmission beam for which the measured RSRP, RSRQ, or SINR is above a threshold.

Aspect 3 is the method of aspect 2, where determining the first set of candidate BPLs associated with the first SL includes receiving, from the second UE, an indication of the first set of candidate BPLs.

Aspect 4 is the method of any of aspects 2 to 3, where the threshold is determined based on at least one of a RSRP, a RSRQ, or a SINR measured for at least one BPL in the second set of candidate BPLs.

Aspect 5 is the method of aspect 4, where the threshold is determined based on a maximum of at least one of a RSRP, a RSRQ, or a SINR measured for the at least one BPL in the second set of candidate BPLs.

Aspect 6 is the method of any of aspects 1 to 5, where the configuration for FD beam training comprises at least one of a TCI indicating a QCL associated with each of the beams in the first set of candidate BPLs and the second set of candidate BPLs, and RS configurations for at least one BPL in the first set of candidate BPLs and the second set of candidate BPLs.

Aspect 7 is the method of any of aspects 1 to 6, where the first UE has at least a first TRP associated with the first SL and a second TRP associated with the second SL, and where the plurality of instances for which the first UE transmits and receives RS at a same time comprises a plurality of instances for which the first UE transmits RS from the first TRP and receives RS at the second TRP at a same time.

Aspect 8 is the method of aspect 7, where the first TRP is associated with directional transmission beams in the first set of candidate BPLs, the second TRP is associated with directional reception beams in the second set of candidate BPLs, and selecting the first BPL for the first SL and the second BPL for the second SL includes transmitting, from the first TRP, a set of one or more RS for each BPL in the first set of candidate BPLs, the set of one or more RS comprising at least one RS for reception by each of the reception beams in a BPL of the first set of candidate BPLs and the second set of candidate BPLs; measuring, for each transmitted RS in the set of one or more RS received at the second TRP, at least one of a RSRP, a RSRQ, or a SINR for (1) the transmitted set of one or more RS and (2) at least one simultaneously-received RS from the second UE, the at least one simultaneously-received RS being transmitted via a transmission beam in a BPL of the second set of candidate BPLs; receiving, from the second UE, information regarding measurements of RS associated with the transmission beams in the first set of candidate BPLs and the second set of candidate BPLs; and selecting the first BPL for the first SL and the second BPL for the second SL based on the measurements of the transmitted set of one or more RS and the at least one simultaneously-received RS from the second UE.

Aspect 9 is the method of aspect 8, where selecting the BPLs for the first SL and the second SL based on the measurements of the simultaneously-received RS includes determining, based on the measurements of RS at the first UE and the information regarding measurements of RS received from the second UE, at least one combination of a first BPL from the first set of candidate BPLs and a second BPL from the second set of candidate BPLs for which RS each have a SINR above a threshold when transmitting and receiving RS via the determined first and second BPLs simultaneously; and selecting at least one determined combination of BPLs that comprises the first BPL for the first SL and the second BPL for the second SL.

Aspect 10 is the method of any of aspects 8 or 9, where, for each transmitted RS in the set of one or more RS, the at least one simultaneously-received RS comprises (1) at least one simultaneously-received RS that overlaps, in a set of available frequency resources, with the transmitted RS and (2) at least one simultaneously-received RS that does not overlap, in the set of available frequency resources, with the transmitted RS.

Aspect 11 is the method of aspect 10, further including determining whether the first SL and the second SL are capable of establishing SFFD communication based on (1) the measurements of at least one transmitted RS in the set of one or more RS and the at least one simultaneously-received RS that overlaps, in the set of available frequency resources, with the at least one transmitted RS in the set of one or more RS and (2) the information regarding measurements of RS received from the second UE; determining whether the first SL and the second SL are capable of establishing SBFD communication based on (1) the measurements of at least one transmitted RS in the set of one or more RS and the at least one simultaneously-received RS that does not overlap, in the set of available frequency resources, with the at least one transmitted RS in the set of one or more RS and (2) the information regarding measurements of RS received from the second UE; and determining to establish one of SFFD communication and SBFD communication with the second UE based on at least one of (1) the determining whether the first SL and the second SL are capable of establishing SFFD and (2) the determining whether the first SL and the second SL are capable of establishing SBFD communication.

Aspect 12 is an apparatus for wireless communication including at least one processor coupled to a memory and configured to implement a method as in any of aspects 1 to 11.

Aspect 13 is an apparatus for wireless communication including means for implementing a method as in any of aspects 1 to 11.

Aspect 14 is a computer-readable medium storing computer executable code, where the code when executed by a processor causes the processor to implement a method as in any of aspects 1 to 11.

What is claimed is:

1. A method of wireless communication for a first user equipment (UE), comprising:
   determining (1) a first set of candidate beam pair links (BPLs) associated with a first sidelink (SL), the first UE transmitting data to a second UE via the first SL and (2) a second set of candidate BPLs associated with a second SL, the first UE receiving data from the second UE via the second SL;
   determining a configuration for full-duplex (FD) beam training based on the determined first set of candidate BPLs and the determined second set of candidate BPLs, the configuration for FD beam training comprising a plurality of instances for which the first UE transmits and receives reference signals (RS) at a same time;
   selecting, based on the determined configuration for FD beam training, (1) a first BPL in the first set of candidate BPLs for the first SL and (2) a second BPL in the second set of candidate BPLs for the second SL; and
   establishing FD communication with the second UE based on the selected first BPL and the selected second BPL.

2. The method of claim 1, wherein determining the second set of candidate BPLs associated with the second SL comprises:
   measuring, for each of a plurality of reception beams of the first UE, at least one of a reference signal received power (RSRP), a reference signal received quality (RSRQ), or a signal-to-interference-plus-noise ratio (SINR) for a set of RS comprising at least one RS transmitted from each of a plurality of transmission beams of the second UE; and
   determining that the second set of candidate BPLs includes each pair of reception beam and transmission beam for which the measured RSRP, RSRQ, or SINR is above a threshold.

3. The method of claim 2, wherein determining the first set of candidate BPLs associated with the first SL comprises receiving, from the second UE, an indication of the first set of candidate BPLs.

4. The method of claim 2, wherein the threshold is determined based on at least one of a RSRP, a RSRQ, or a SINR measured for at least one BPL in the second set of candidate BPLs.

5. The method of claim 1, wherein the configuration for FD beam training comprises at least one of a transmission configuration indicator (TCI) indicating a quasi-co-location (QCL) associated with each of the beams in the first set of candidate BPLs and the second set of candidate BPLs, and RS configurations for at least one BPL in the first set of candidate BPLs and the second set of candidate BPLs.

6. The method of claim 1, wherein the first UE comprises at least a first transmission-reception point (TRP) associated with the first SL and a second TRP associated with the second SL, and wherein the plurality of instances for which the first UE transmits and receives RS at a same time comprises a plurality of instances for which the first UE transmits RS from the first TRP and receives RS at the second TRP at a same time.

7. The method of claim 6, wherein the first TRP is associated with directional transmission beams in the first set of candidate BPLs, the second TRP is associated with directional reception beams in the second set of candidate BPLs, and selecting the first BPL for the first SL and the second BPL for the second SL comprises:
   transmitting, from the first TRP, a set of one or more RS for each BPL in the first set of candidate BPLs, the set of one or more RS comprising at least one RS for reception by each of the reception beams in a BPL of the first set of candidate BPLs and the second set of candidate BPLs;
   measuring, for each transmitted RS in the set of one or more RS received at the second TRP, at least one of a reference signal received power (RSRP), a reference signal received quality (RSRQ), or a signal-to-interference-plus-noise ratio (SINR) for (1) the transmitted set of one or more RS and (2) at least one simultaneously-received RS from the second UE, the at least one simultaneously-received RS being transmitted via a transmission beam in a BPL of the second set of candidate BPLs;
   receiving, from the second UE, information regarding measurements of RS associated with the transmission beams in the first set of candidate BPLs and the second set of candidate BPLs; and
   selecting the first BPL for the first SL and the second BPL for the second SL based on the measurements of the transmitted set of one or more RS and the at least one simultaneously-received RS from the second UE.

8. The method of claim 7, wherein selecting the BPLs for the first SL and the second SL based on the measurements of the simultaneously-received RS comprises:
   determining, based on the measurements of RS at the first UE and the information regarding measurements of RS received from the second UE, at least one combination of a first BPL from the first set of candidate BPLs and a second BPL from the second set of candidate BPLs for which RS each have a SINR above a threshold when transmitting and receiving RS via the determined first and second BPLs simultaneously; and selecting at least one determined combination of BPLs that comprises the first BPL for the first SL and the second BPL for the second SL.

9. The method of claim 7, wherein, for each transmitted RS in the set of one or more RS, the at least one simultaneously-received RS comprises (1) at least one simultaneously-received RS that overlaps, in a set of available frequency resources, with the transmitted RS and (2) at least one simultaneously-received RS that does not overlap, in the set of available frequency resources, with the transmitted RS.

10. A first apparatus for wireless communication, comprising:
a memory; and
at least one processor coupled to the memory and configured to:
determine (1) a first set of candidate beam pair links (BPLs) associated with a first sidelink (SL), the first apparatus transmitting data to a second apparatus via the first SL and (2) a second set of candidate BPLs associated with a second SL, the first apparatus receiving data from the second apparatus via the second SL;
determine a configuration for full-duplex (FD) beam training based on the determined first set of candidate BPLs and the determined second set of candidate BPLs, the configuration for FD beam training comprising a plurality of instances for which the first apparatus transmits and receives reference signals (RS) at a same time;
select, based on the determined configuration for FD beam training, (1) a first BPL in the first set of candidate BPLs for the first SL and (2) a second BPL in the second set of candidate BPLs for the second SL; and
establish FD communication with the second apparatus based on the selected first BPL and the selected second BPL.

11. The apparatus of claim 10, wherein the processor configured to determine the second set of candidate BPLs associated with the second SL is further configured to:
measure, for each of a plurality of reception beams of the first apparatus, at least one of a reference signal received power (RSRP), a reference signal received quality (RSRQ), or a signal-to-interference-plus-noise ratio (SINR) for a set of RS comprising at least one RS transmitted from each of a plurality of transmission beams of the second apparatus; and
determine that the second set of candidate BPLs includes each pair of reception beam and transmission beam for which the measured RSRP, RSRQ, or SINR is above a threshold.

12. The apparatus of claim 11, wherein the processor configured to determine the first set of candidate BPLs associated with the first SL is further configured to receive, from the second apparatus, an indication of the first set of candidate BPLs.

13. The apparatus of claim 11, wherein the threshold is determined based on at least one of a RSRP, a RSRQ, or a SINR measured for at least one BPL in the second set of candidate BPLs.

14. The apparatus of claim 10, wherein the configuration for FD beam training comprises at least one of a transmission configuration indicator (TCI) indicating a quasi-co-location (QCL) associated with each of the beams in the first set of candidate BPLs and the second set of candidate BPLs, and RS configurations for at least one BPL in the first set of candidate BPLs and the second set of candidate BPLs.

15. The apparatus of claim 10, wherein the first apparatus comprises at least a first transmission-reception point (TRP) associated with the first SL and a second TRP associated with the second SL, and wherein the plurality of instances for which the first apparatus transmits and receives RS at a same time comprises a plurality of instances for which the first apparatus transmits RS from the first TRP and receives RS at the second TRP at a same time.

16. The apparatus of claim 15, wherein the first TRP is associated with directional transmission beams in the first set of candidate BPLs, the second TRP is associated with directional reception beams in the second set of candidate BPLs, and the processor configured to select the first BPL for the first SL and the second BPL for the second SL is further configured to:
transmit, from the first TRP, a set of one or more RS for each BPL in the first set of candidate BPLs, the set of one or more RS comprising at least one RS for reception by each of the reception beams in a BPL of the first set of candidate BPLs and the second set of candidate BPLs;
measure, for each transmitted RS in the set of one or more RS received at the second TRP, at least one of a reference signal received power (RSRP), a reference signal received quality (RSRQ), or a signal-to-interference-plus-noise ratio (SINR) for (1) the transmitted set of one or more RS and (2) at least one simultaneously-received RS from the second apparatus, the at least one simultaneously-received RS being transmitted via a transmission beam in a BPL of the second set of candidate BPLs;
receive, from the second apparatus, information regarding measurements of RS associated with the transmission beams in the first set of candidate BPLs and the second set of candidate BPLs; and
select the first BPL for the first SL and the second BPL for the second SL based on the measurements of the transmitted set of one or more RS and the at least one simultaneously-received RS from the second apparatus.

17. The apparatus of claim 16, wherein the processor configured to select the BPLs for the first SL and the second SL based on the measurements of the simultaneously-received RS is further configured to:
determine, based on the measurements of RS at the first apparatus and the information regarding measurements of RS received from the second apparatus, at least one combination of a first BPL from the first set of candidate BPLs and a second BPL from the second set of candidate BPLs for which RS each have a SINR above a threshold when transmitting and receiving RS via the determined first and second BPLs simultaneously; and
select at least one determined combination of BPLs that comprises the first BPL for the first SL and the second BPL for the second SL.

18. The apparatus of claim 16, wherein, for each transmitted RS in the set of one or more RS, the at least one simultaneously-received RS comprises (1) at least one simultaneously-received RS that overlaps, in a set of available frequency resources, with the transmitted RS and (2) at least one simultaneously-received RS that does not overlap, in the set of available frequency resources, with the transmitted RS.

19. A first apparatus for wireless communication, comprising:
means for determining (1) a first set of candidate beam pair links (BPLs) associated with a first sidelink (SL), the first apparatus transmitting data to a second apparatus via the first SL and (2) a second set of candidate BPLs associated with a second SL, the first apparatus receiving data from the second apparatus via the second SL;
means for determining a configuration for full-duplex (FD) beam training based on the determined first set of candidate BPLs and the determined second set of candidate BPLs, the configuration for FD beam training comprising a plurality of instances for which the first apparatus transmits and receives reference signals (RS) at a same time;
means for selecting, based on the determined configuration for FD beam training, (1) a first BPL in the first set of candidate BPLs for the first SL and (2) a second BPL in the second set of candidate BPLs for the second SL; and
means for establishing FD communication with the second apparatus based on the selected first BPL and the selected second BPL.

20. The apparatus of claim 19, wherein the means for determining the second set of candidate BPLs associated with the second SL further comprises:
means for measuring, for each of a plurality of reception beams of the first apparatus, at least one of a reference signal received power (RSRP), a reference signal received quality (RSRQ), or a signal-to-interference-plus-noise ratio (SINR) for a set of RS comprising at least one RS transmitted from each of a plurality of transmission beams of the second apparatus; and
means for determining that the second set of candidate BPLs includes each pair of reception beam and transmission beam for which the measured RSRP, RSRQ, or SINR is above a threshold.

21. The apparatus of claim 20, wherein the first apparatus comprises at least a first transmission-reception point (TRP) associated with the first SL and a second TRP associated with the second SL, and wherein the plurality of instances for which the first apparatus transmits and receives RS at a same time comprises a plurality of instances for which the first apparatus transmits RS from the first TRP and receives RS at the second TRP at a same time.

22. The apparatus of claim 21, wherein the first TRP is associated with directional transmission beams in the first set of candidate BPLs, the second TRP is associated with directional reception beams in the second set of candidate BPLs, and the means for selecting the first BPL for the first SL and the second BPL for the second SL further comprises:
means for transmitting, from the first TRP, a set of one or more RS for each BPL in the first set of candidate BPLs, the set of one or more RS comprising at least one RS for reception by each of the reception beams in a BPL of the first set of candidate BPLs and the second set of candidate BPLs;
means for measuring, for each transmitted RS in the set of one or more RS received at the second TRP, at least one of a reference signal received power (RSRP), a reference signal received quality (RSRQ), or a signal-to-interference-plus-noise ratio (SINR) for (1) the transmitted set of one or more RS and (2) at least one simultaneously-received RS from the second apparatus, the at least one simultaneously-received RS being transmitted via a transmission beam in a BPL of the second set of candidate BPLs;
means for receiving, from the second apparatus, information regarding measurements of RS associated with the transmission beams in the first set of candidate BPLs and the second set of candidate BPLs; and
means for selecting the first BPL for the first SL and the second BPL for the second SL based on the measurements of the transmitted set of one or more RS and the at least one simultaneously-received RS from the second apparatus.

23. The apparatus of claim 22, wherein the means for selecting the BPLs for the first SL and the second SL based on the measurements of the simultaneously-received RS further comprises:
means for determining, based on the measurements of RS at the first apparatus and the information regarding measurements of RS received from the second apparatus, at least one combination of a first BPL from the first set of candidate BPLs and a second BPL from the second set of candidate BPLs for which RS each have a SINR above a threshold when transmitting and receiving RS via the determined first and second BPLs simultaneously; and
means for selecting at least one determined combination of BPLs that comprises the first BPL for the first SL and the second BPL for the second SL.

24. The apparatus of claim 22, wherein, for each transmitted RS in the set of one or more RS, the at least one simultaneously-received RS comprises (1) at least one simultaneously-received RS that overlaps, in a set of available frequency resources, with the transmitted RS and (2) at least one simultaneously-received RS that does not overlap, in the set of available frequency resources, with the transmitted RS.

25. A non-transitory computer-readable medium storing computer executable code, the code when executed by a processor causes the processor to:
determine (1) a first set of candidate beam pair links (BPLs) associated with a first sidelink (SL), a first UE transmitting data to a second UE via the first SL and (2) a second set of candidate BPLs associated with a second SL, the first UE receiving data from the second UE via the second SL;
determine a configuration for full-duplex (FD) beam training based on the determined first set of candidate BPLs and the determined second set of candidate BPLs, the configuration for FD beam training comprising a plurality of instances for which the first UE transmits and receives reference signals (RS) at a same time;
select, based on the determined configuration for FD beam training, (1) a first BPL in the first set of candidate BPLs for the first SL and (2) a second BPL in the second set of candidate BPLs for the second SL; and
establish FD communication with the second UE based on the selected first BPL and the selected second BPL.

* * * * *